US012567319B2

(12) United States Patent
Hutz

(10) Patent No.: US 12,567,319 B2
(45) Date of Patent: *Mar. 3, 2026

(54) ABERRATION ENGINE

(71) Applicant: Alarm.com Incorporated, Tysons, VA (US)

(72) Inventor: David James Hutz, Herndon, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/400,327

(22) Filed: Dec. 29, 2023

(65) Prior Publication Data

US 2024/0135801 A1    Apr. 25, 2024

Related U.S. Application Data

(63) Continuation of application No. 17/519,982, filed on Nov. 5, 2021, now Pat. No. 11,862,005, which is a
(Continued)

(51) Int. Cl.
*G08B 29/00*        (2006.01)
*G08B 1/08*         (2006.01)
(Continued)

(52) U.S. Cl.
CPC .............. *G08B 29/00* (2013.01); *G08B 1/08* (2013.01); *G08B 13/00* (2013.01); *G08B 21/0423* (2013.01); *G08B 23/00* (2013.01); *G08B 25/00* (2013.01); *G08B 31/00*

(2013.01); *H04M 11/04* (2013.01); *G05B 23/02* (2013.01); *G08B 21/0469* (2013.01); *G08B 25/009* (2013.01); *H04N 7/18* (2013.01)

(58) Field of Classification Search
CPC .......... G08B 13/00; G08B 29/00; G08B 1/08; G08B 23/00; G08B 21/22; G08B 13/19695; H04M 11/04
See application file for complete search history.

(56) References Cited

U.S. PATENT DOCUMENTS 5,610,596 A    3/1997 Petitclerc
6,421,453 B1   7/2002 Kanevsky et al.
(Continued)

FOREIGN PATENT DOCUMENTS

JP        3804530 B2    8/2006

OTHER PUBLICATIONS

U.S. Non-Final Office Action for U.S. Appl. No. 13/608,148 dated Nov. 20, 2013, 40 pages.
(Continued)

*Primary Examiner* — Mirza F Alam
(74) *Attorney, Agent, or Firm* — Fish & Richardson P.C.

(57) ABSTRACT

An aberration engine that collects data sensed by a monitoring system that monitors a property of a user and aggregates the collected data over a period of a time. The aberration engine detects, within the aggregated data, patterns of recurring events and, based on detecting the patterns of recurring events within the aggregated data, takes action related to the monitoring system based on the detected patterns of recurring events within the aggregated data.

20 Claims, 16 Drawing Sheets

Related U.S. Application Data continuation of application No. 16/773,217, filed on Jan. 27, 2020, now Pat. No. 11,170,633, which is a continuation of application No. 15/924,889, filed on Mar. 19, 2018, now Pat. No. 10,546,485, which is a continuation of application No. 15/330,784, filed on Nov. 7, 2016, now Pat. No. 9,922,540, which is a continuation of application No. 14/878,333, filed on Oct. 8, 2015, now Pat. No. 9,489,826, which is a continuation of application No. 14/335,545, filed on Jul. 18, 2014, now Pat. No. 9,165,455, which is a continuation of application No. 13/608,148, filed on Sep. 10, 2012, now Pat. No. 8,786,425.

(60) Provisional application No. 61/532,603, filed on Sep. 9, 2011.

(51) Int. Cl.

| | |
|---|---|
| *G08B 13/00* | (2006.01) |
| *G08B 21/04* | (2006.01) |
| *G08B 23/00* | (2006.01) |
| *G08B 25/00* | (2006.01) |
| *G08B 31/00* | (2006.01) |
| *H04M 11/04* | (2006.01) |
| *G05B 23/02* | (2006.01) |
| *H04N 7/18* | (2006.01) |

(56) References Cited

U.S. PATENT DOCUMENTS

| | | | | |
|---|---|---|---|---|
| 6,796,799 | B1 | 9/2004 | Yoshiike et al. | |
| 7,027,808 | B2 | 4/2006 | Wesby | |
| 7,065,472 | B2 | 6/2006 | Hayashi et al. | |
| 7,119,609 | B2 | 10/2006 | Naidoo et al. | |
| 7,132,941 | B2* | 11/2006 | Sherlock | G08B 21/22 |
| | | | | 340/539.26 |
| 7,587,299 | B2 | 9/2009 | Miyasaka et al. | |
| 7,633,388 | B2 | 12/2009 | Simon et al. | |
| 7,843,454 | B1 | 11/2010 | Biswas | |
| 8,098,156 | B2 | 1/2012 | Caler et al. | |
| 8,743,716 | B2 | 6/2014 | Ree et al. | |
| 8,823,795 | B1 | 9/2014 | Scalisi et al. | |
| 9,158,974 | B1 | 10/2015 | Laska et al. | |
| 9,280,590 | B1 | 3/2016 | McPhie et al. | |
| 9,626,814 | B2 | 4/2017 | Eyring et al. | |
| 9,767,680 | B1 | 9/2017 | Trundle | |
| 10,096,236 | B1 | 10/2018 | Trundle | |
| 10,121,301 | B1 | 11/2018 | Ren et al. | |
| 10,249,069 | B1 | 4/2019 | Kerzner et al. | |
| 10,347,063 | B1 | 7/2019 | LaRovere et al. | |
| 10,529,101 | B1 | 1/2020 | Kerzner et al. | |
| 10,535,253 | B1 | 1/2020 | Trundle | |
| 10,638,096 | B1 | 4/2020 | Lin | |
| 10,674,120 | B2 | 6/2020 | Carter | |
| 10,854,067 | B1 | 12/2020 | Giles | |
| 11,132,892 | B1 | 9/2021 | Trundle | |
| 11,134,228 | B1 | 9/2021 | Lin | |
| 11,195,311 | B1 | 12/2021 | Kerzner et al. | |
| 11,423,756 | B2 | 8/2022 | Dawes et al. | |
| 11,539,922 | B2 | 12/2022 | Lin | |
| 11,887,223 | B2 | 1/2024 | Kerzner et al. | |
| 11,908,257 | B2 | 2/2024 | Wechsler et al. | |
| 11,978,008 | B2 | 5/2024 | Felice et al. | |
| 12,206,826 | B2 | 1/2025 | Lung et al. | |
| 12,265,869 | B1 | 4/2025 | Khanna et al. | |
| 12,300,054 | B2 | 5/2025 | Carter | |
| 12,300,081 | B2 | 5/2025 | Hussain | |
| 2003/0025599 | A1 | 2/2003 | Monroe | |
| 2003/0117279 | A1 | 6/2003 | Ueno et al. | |
| 2003/0202099 | A1 | 10/2003 | Nakamura et al. | |
| 2004/0257336 | A1 | 12/2004 | Hershkovitz et al. | |
| 2005/0254548 | A1 | 11/2005 | Appel | |
| 2006/0005045 | A1 | 1/2006 | Nakase | |
| 2007/0024707 | A1* | 2/2007 | Brodsky | H04N 5/232 |
| | | | | 348/143 |
| 2007/0094386 | A1 | 4/2007 | Bley et al. | |
| 2007/0156060 | A1 | 7/2007 | Cervantes | |
| 2007/0262857 | A1* | 11/2007 | Jackson | G06T 7/70 |
| | | | | 340/506 |
| 2008/0288933 | A1 | 11/2008 | Budmiger et al. | |
| 2009/0027196 | A1* | 1/2009 | Schoettle | G08B 13/10 |
| | | | | 340/541 |
| 2009/0195401 | A1 | 8/2009 | Maroney et al. | |
| 2010/0023865 | A1 | 1/2010 | Fulker et al. | |
| 2010/0156655 | A1 | 6/2010 | Bullemer et al. | |
| 2010/0214103 | A1 | 8/2010 | Egan et al. | |
| 2011/0006891 | A1 | 1/2011 | Cho | |
| 2011/0102171 | A1* | 5/2011 | Raji | G06F 16/954 |
| | | | | 340/539.11 |
| 2013/0120571 | A1 | 5/2013 | Lee et al. | |
| 2013/0173218 | A1 | 7/2013 | Maeda et al. | |
| 2013/0182107 | A1 | 7/2013 | Anderson | |
| 2013/0208109 | A1 | 8/2013 | Landry | |
| 2013/0321245 | A1 | 12/2013 | Harper | |
| 2014/0098247 | A1 | 4/2014 | Rao et al. | |
| 2015/0160935 | A1 | 6/2015 | Nye | |
| 2015/0229918 | A1 | 8/2015 | Kosuge | |
| 2015/0244989 | A1 | 8/2015 | Lao | |
| 2015/0288928 | A1 | 10/2015 | McCoy et al. | |
| 2015/0301515 | A1 | 10/2015 | Houmb | |
| 2015/0316594 | A1 | 11/2015 | Kania et al. | |
| 2016/0086461 | A1 | 3/2016 | Geng et al. | |
| 2016/0225240 | A1 | 8/2016 | Voddhi et al. | |
| 2016/0294630 | A1 | 10/2016 | Verma et al. | |
| 2016/0358457 | A1 | 12/2016 | Nye et al. | |
| 2017/0034485 | A1 | 2/2017 | Scalisi | |
| 2017/0076365 | A1 | 3/2017 | D'Souza et al. | |
| 2017/0099357 | A1* | 4/2017 | Haupt | H04L 67/02 |
| 2017/0102696 | A1 | 4/2017 | Bell et al. | |
| 2018/0129885 | A1 | 5/2018 | Potter et al. | |
| 2018/0139332 | A1 | 5/2018 | Kerzner | |
| 2018/0293864 | A1 | 10/2018 | Wedig et al. | |
| 2018/0341835 | A1 | 11/2018 | Siminoff | |
| 2019/0066485 | A1 | 2/2019 | Roberts et al. | |
| 2021/0110453 | A1 | 4/2021 | Davies et al. | |
| 2022/0006980 | A1 | 1/2022 | Lin | |
| 2022/0013002 | A1 | 1/2022 | Trundle | |
| 2022/0092833 | A1 | 3/2022 | Kerzner et al. | |
| 2023/0119879 | A1 | 4/2023 | Lin | |
| 2023/0251610 | A1 | 8/2023 | Jordan, II et al. | |
| 2024/0119650 | A1 | 4/2024 | Kerzner et al. | |

OTHER PUBLICATIONS

U.S. Notice of Allowance for U.S. Appl. No. 13/608,148 dated May 5, 2014, 10 pages.

U.S. Notice of Allowance for U.S. Appl. No. 14/335,545 dated Mar. 17, 2015, 20 pages.

U.S. Non-Final Office Action for U.S. Appl. No. 14/878,333 dated Dec. 30, 2015, 52 pages.

U.S. Notice of Allowance for U.S. Appl. No. 14/878,333 dated Jul. 8, 2016, 11 pages.

* cited by examiner

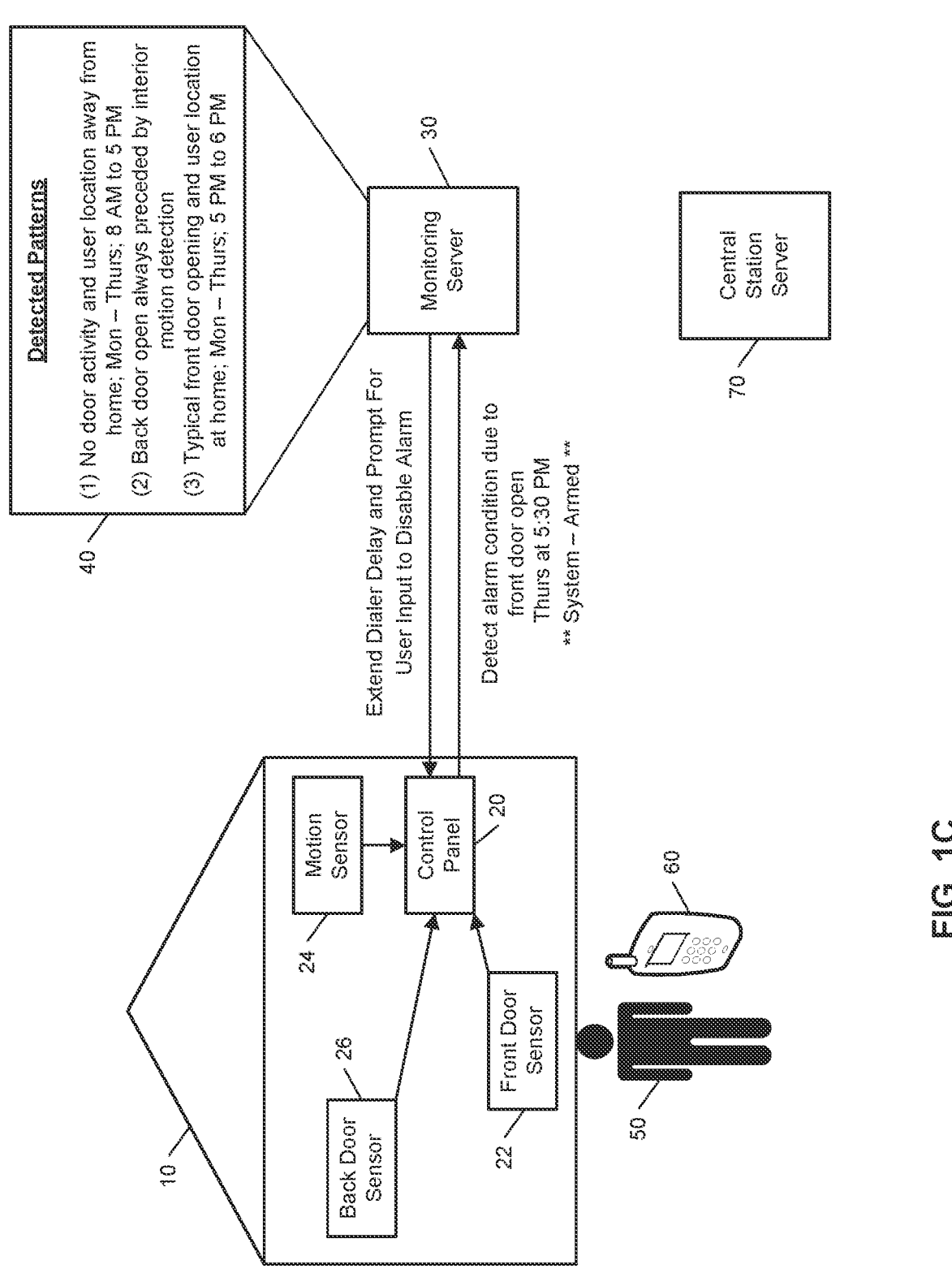

Detected Patterns

(1) No door activity and user location away from home; Mon – Thurs; 8 AM to 5 PM (2) Back door open always preceded by interior motion detection (3) Typical front door opening and user location at home; Mon – Thurs; 5 PM to 6 PM Extend Dialer Delay and Prompt For User Input to Disable Alarm Detect alarm condition due to front door open Thurs at 5:30 PM

System – Armed

Monitoring Server

Central Station Server

Motion Sensor

Control Panel

Back Door Sensor

Front Door Sensor

FIG. 1C

<span style="text-align:center">300</span>

COLLECT DATA SENSED BY A MONITORING SYSTEM THAT MONITORS A PROPERTY OF A USER — 310

AGGREGATE THE COLLECTED DATA OVER A PERIOD OF A TIME — 320

DETECT, WITHIN THE AGGREGATED DATA, PATTERNS OF RECURRING EVENTS — 330

TAKE ACTION RELATED TO THE MONITORING SYSTEM BASED ON THE DETECTED PATTERNS OF RECURRING EVENTS — 340

400

| Detected Pattern | Confidence |
|---|---|
| Lack of activity on Saturday between 7 AM and 1 PM | 60 |
| Arm "Stay" by 11 PM Daily when all users are detected as being at home | 90 |
| Arm "Away" by 9 AM Monday to Friday when all users are detected as being away from home | 95 |
| Window opening preceded by interior motion detection | 100 |
| Back door opening preceded by interior motion detection Daily between 6 AM to 7 AM and 10 PM and 11 PM | 80 |
| Lack of activity on Sunday between 8 AM and 12 PM | 70 |

Figure 8:
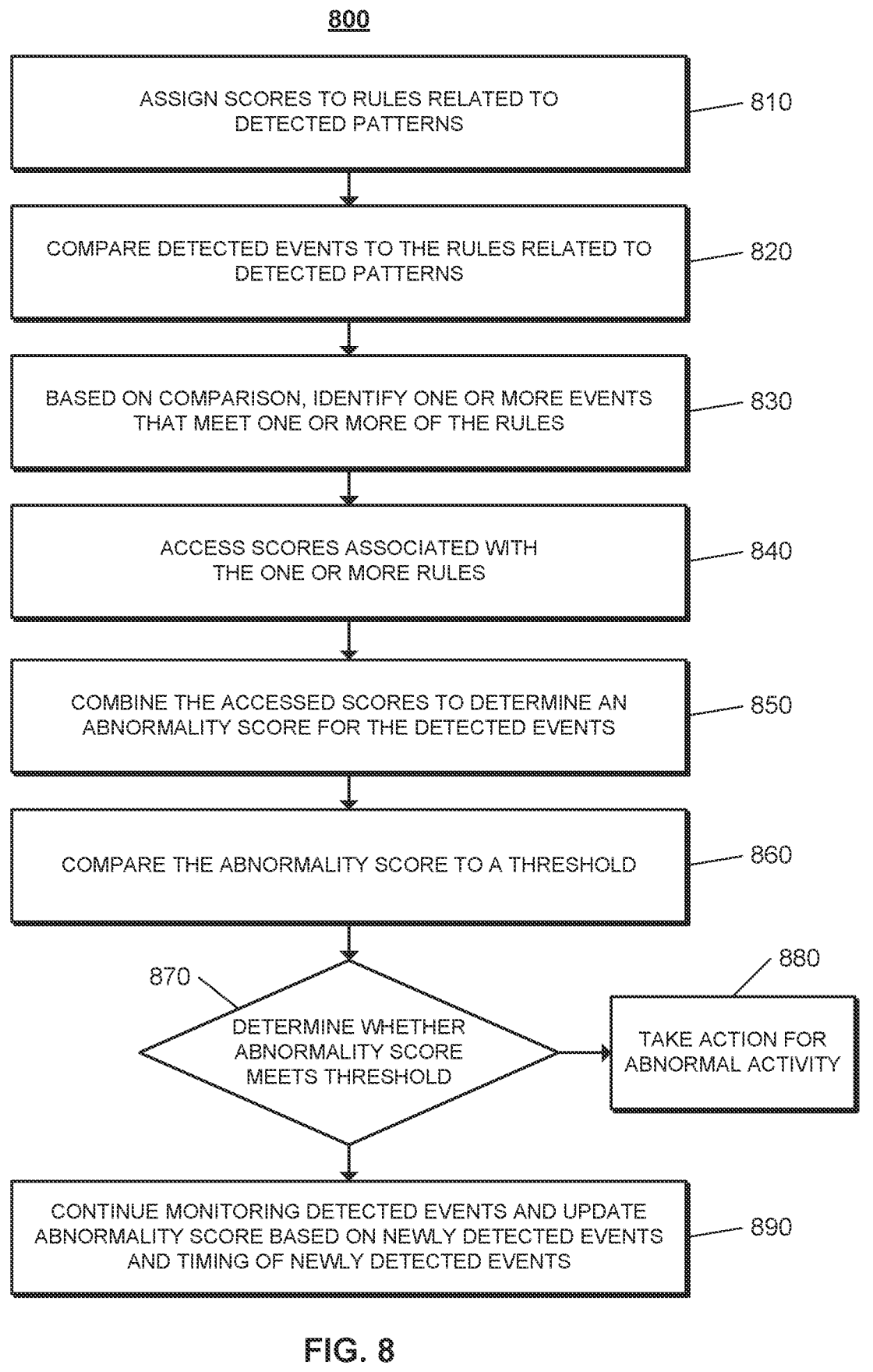

ASSIGN SCORES TO RULES RELATED TO DETECTED PATTERNS —— 810

COMPARE DETECTED EVENTS TO THE RULES RELATED TO DETECTED PATTERNS —— 820

BASED ON COMPARISON, IDENTIFY ONE OR MORE EVENTS THAT MEET ONE OR MORE OF THE RULES —— 830

ACCESS SCORES ASSOCIATED WITH THE ONE OR MORE RULES —— 840

COMBINE THE ACCESSED SCORES TO DETERMINE AN ABNORMALITY SCORE FOR THE DETECTED EVENTS —— 850

COMPARE THE ABNORMALITY SCORE TO A THRESHOLD —— 860

870 — DETERMINE WHETHER ABNORMALITY SCORE MEETS THRESHOLD

880 — TAKE ACTION FOR ABNORMAL ACTIVITY

CONTINUE MONITORING DETECTED EVENTS AND UPDATE ABNORMALITY SCORE BASED ON NEWLY DETECTED EVENTS AND TIMING OF NEWLY DETECTED EVENTS —— 890

| Abnormal Activity Detection Rules | Score |
|---|---|
| Activity on Saturday between 7 AM and 1 PM | 0.1 |
| Activity on Sunday between 8 AM and 12 PM | 0.2 |
| Activity on Monday to Thursday between 9 AM and 5 PM | 0.4 |
| Window opening not preceded by interior motion detection | 1.0 |
| Door opening followed by interior motion detection between 11 PM to 6 AM | 0.8 |
| User Location -- Away From Home | 0.2 |
| User Location -- At Home | - 0.6 |
| Recent Trend of Ignoring Abnormal Activity Alerts | - 0.2 |

RECEIVE USER INPUT RELATED TO USE OF PATTERNS IN
PERFORMING MONITORING SYSTEM ACTIONS — 1010

BASED ON THE USER INPUT, UPDATE SETTINGS RELATED TO
USING PATTERNS TO PERFORM MONITORING SYSTEM ACTIONS — 1020

USE PATTERNS TO PERFORM MONITORING SYSTEM ACTIONS
BASED ON THE UPDATED SETTINGS — 1030

1200

TRACK ADDITIONAL EVENTS AFTER STORING DATA RELATED TO TAKING ACTION BASED ON DETECTED PATTERNS — 1210

ANALYZE THE ADDITIONAL EVENTS WITH RESPECT TO THE DATA RELATED TO TAKING ACTION — 1220

BASED ON THE ANALYSIS, TAKE ACTION RELATED TO UPDATING RULES USED IN TAKING ACTION FOR ABNORMAL EVENTS — 1230

1300

ABERRATION ENGINE

CROSS REFERENCE TO RELATED APPLICATIONS

The present application is a continuation of U.S. application Ser. No. 17/519,982, filed Nov. 5, 2021, now allowed, which is a continuation of U.S. application Ser. No. 16/773, 217, filed Jan. 27, 2020, now U.S. Pat. No. 11,170,633, issued Nov. 9, 2021, which is a continuation of U.S. application Ser. No. 15/924,889, filed Mar. 19, 2018, now U.S. Pat. No. 10,546,485, issued Jan. 28, 2020, which is a continuation of U.S. application Ser. No. 15/330,784, filed Nov. 7, 2016, now U.S. Pat. No. 9,922,540, issued Mar. 20, 2018, which is a continuation of U.S. application Ser. No. 14/878,333, filed Oct. 8, 2015, now U.S. Pat. No. 9,489,826, issued Nov. 8, 2016, which is a continuation of U.S. application Ser. No. 14/335,545, filed Jul. 18, 2014, now U.S. Pat. No. 9,165,455, issued Oct. 20, 2015, which is a continuation of U.S. application Ser. No. 13/608,148, filed Sep. 10, 2012, now U.S. Pat. No. 8,786,425, issued Jul. 22, 2014, which claims the benefit of U.S. Provisional Application No. 61/532,603, filed Sep. 9, 2011, each of which is incorporated herein by reference in its entirety for all purposes.

TECHNICAL FIELD

This disclosure relates to monitoring technology and, for example, detecting events based on a pattern of past monitoring activity.

BACKGROUND

Many people equip homes and businesses with alarm systems to provide increased security for their homes and businesses. Alarm systems may include control panels that a person may use to control operation of the alarm system and sensors that monitor for security breaches. In response to an alarm system detecting a security breach, the alarm system may generate an audible alert and, if the alarm system is monitored by a monitoring service, the alarm system may send electronic data to the monitoring service to alert the monitoring service of the security breach.

SUMMARY

Techniques are described for monitoring technology. For example, techniques are described for detecting events based on a pattern of past monitoring activity.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DESCRIPTION OF DRAWINGS

FIGS. 1A-1C illustrate examples of using patterns of recurring events to control monitoring system operations.

FIGS. 3, 8, 10, and 12 are flow charts of example processes.

FIGS. 4 and 9 illustrate example data records.

DETAILED DESCRIPTION

Techniques are described for detecting abnormal activity in a property monitored by a monitoring (e.g., security) system even when the monitoring (e.g., security) system has not been armed by a user. For instance, an aberration engine monitors events detected by a security system and attempts to detect abnormal activity even when the security system is unarmed. Each event will get an "abnormality score" (more than just true/false), and a bunch of slightly suspicious events in a short period of time will aggregate to cause the engine to alert the user. In this regard, the security system may be helpful in monitoring the property even when the user forgets to arm the security system and the security system otherwise would not detect an alarm event.

Figure 1A:
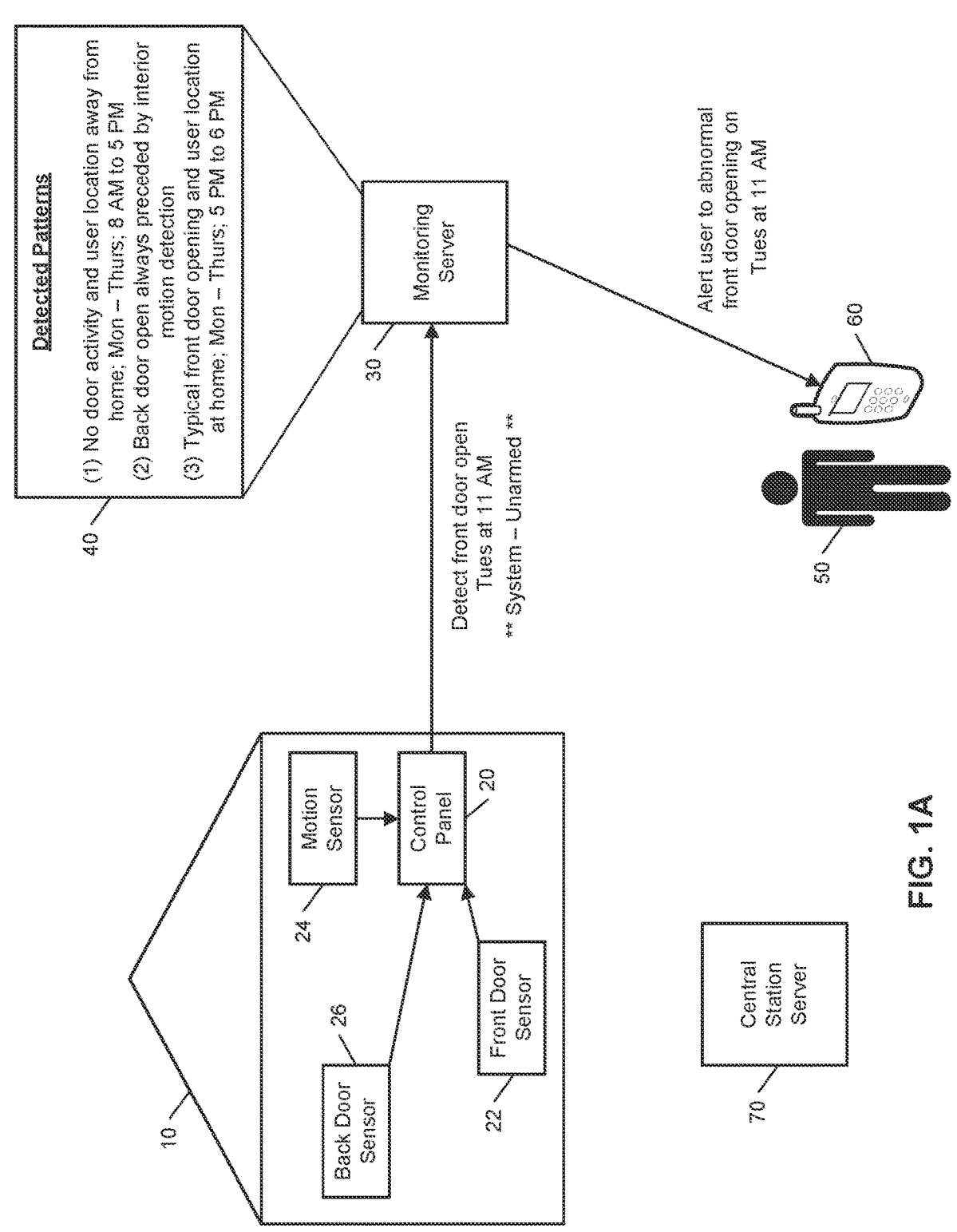
Figure 1B:
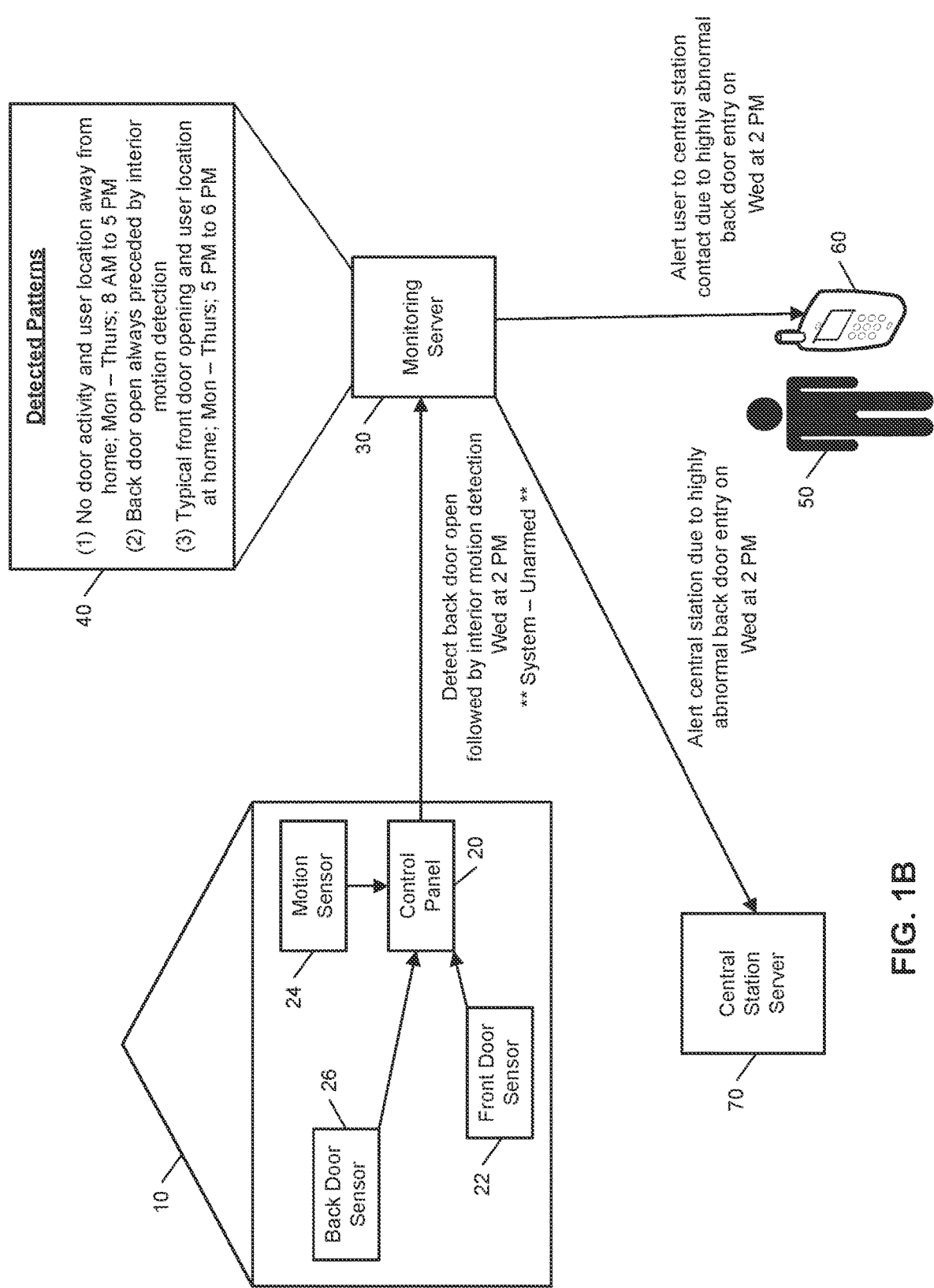

FIGS. 1A-1C illustrate examples of using patterns of recurring events to control monitoring system operations. As shown in FIG. 1A, a property 10 (e.g., a home) of a user 50 is monitored by an in-home monitoring system (e.g., in-home security system) that includes components that are fixed within the property 10. The in-home monitoring system includes a control panel 20, a front door sensor 22, a motion sensor 24, and a back door sensor 26. The front door sensor 22 is a contact sensor positioned at a front door of the property 10 and configured to sense whether the front door is in an open position or a closed position. The motion sensor 24 is configured to sense a moving object within the property 10. The back door sensor 26 is a contact sensor positioned at a back door of the property 10 and configured to sense whether the back door is in an open position or a closed position.

The control panel 20 communicates over a short-range wired or wireless connection with each of the front door sensor 22, the motion sensor 24, and the back door sensor 26 to receive sensor data descriptive of events detected by the front door sensor 22, the motion sensor 24, and the back door sensor 26. The control panel 20 also communicates over a long-range wired or wireless connection with a monitoring server 30. The monitoring server 30 is located remote from the property 10 and manages the in-home monitoring system at the property 10, as well as other (and, perhaps, many more) in-home monitoring systems located at different properties that are owned by different users. The monitoring server 30 receives, from the control panel 20, sensor data descriptive of events detected by the sensors included in the in-home monitoring system of the property 10.

In the example shown in FIG. 1A, the monitoring server 30 collects and aggregates sensor data received from the control panel 20 over a period of time. The period of time may be relatively long and may include sensor data collected over the course of several days, several weeks, several months, and even several years. And, the aggregated sensor data may include all events sensed by the in-home monitoring system during the period of time, regardless of whether the in-home monitoring system was armed in a manner in which the in-home monitoring system detects alarm conditions when the events occurred. The monitoring server 30 analyzes the aggregated sensor data with other data available to the monitoring server 30, such as location data for the user 50, and, based on the analysis, detects patterns of recurring events within the aggregated sensor data and the other data available to the monitoring server 30. The recurring events may be positive events tied to activity in the property detected by the in-home monitoring system or may be negative events that reflect a lack of activity (or a lack of a particular type of activity) in the property detected by the in-home monitoring system.

After detecting patterns of recurring events within the aggregated sensor data and the other data available to the monitoring server 30, the monitoring server 30 stores the detected patterns 40 in electronic storage accessible to the monitoring server 30. As shown in the detected patterns 40, the monitoring server 30 has detected a pattern that, on Monday to Thursday between eight in the morning and five in the afternoon, no door activity exists and a location of the user 50 is away from the property 10. The monitoring server 30 also has detected a pattern that a back door open event detected by the back door sensor 26 is typically (e.g., always) proceeded by an interior motion detection by the motion sensor 24. The monitoring server 30 further has detected a pattern that, on Monday to Thursday between five and six in the afternoon, the front door sensor 22 detects opening of the front door and a location of the user 50 at the property 10.

The monitoring server 30 uses the detected patterns 40 to perform operations related to the in-home monitoring system without requiring input from the user 50 to define rules for the detected patterns. For example, in the example shown in FIG. 1A, the control panel 20 detects a front door open event on a Tuesday at 11 AM based on output from the front door sensor 22. In this example, the control panel 20 does not detect an alarm condition based on the front door open event because the in-home monitoring system is in an unarmed state (e.g., the user 50 forgot to arm the in-home monitoring system upon leaving). The control panel 20 sends a message to the monitoring server 30 indicating detection of the front door open event on Tuesday at 11 AM at a time when the in-home monitoring system is in an unarmed state. The monitoring server 30 receives the message from the control panel 20 and compares the front door open event on Tuesday at 11 AM with the detected patterns 40 that were automatically identified by the monitoring server 30 based on past sensor and other activity collected by the monitoring server 30. Based on the comparison, the monitoring server 30 determines that the front door open event on Tuesday at 11 AM conflicts with the first detected pattern of no door activity on Monday to Thursday between eight in the morning and five in the afternoon.

To confirm whether the first detected pattern is violated, the monitoring server 30 determines a location of the user 50 based on a location of the user's mobile phone 60. The monitoring server 30 may determine the location of the user's mobile phone 60 based on Global Positioning System (GPS) data captured by the mobile phone 60 and sent to the monitoring server 30 over a long-range wireless network (e.g., Cellular network). Based on the determined location of the user 50, the monitoring server 30 determines that the user is away from the property 10 and, therefore, the first detected pattern has been violated. Accordingly, the monitoring server 30 determines that the front door open event on Tuesday at 11 AM detected by the control panel 20 is abnormal and sends an alert to the user 50 indicating the abnormal front door opening. At this time, the monitoring server 30 withholds alerting a central monitoring station server 70 used by a central monitoring station that handles dispatching of emergency services based on alarm conditions detected by monitoring systems. The monitoring server 30 may withhold alerting the central monitoring station server 70 because, although the front door open event is abnormal, the front door open event does not have a high enough degree of abnormality to warrant contacting the central monitoring station server 70 without first alerting the user 50.

The user 50 may view the alert on the mobile phone 60 and take action with respect to the abnormal front door opening. For example, the user 50 may provide user input indicating that the abnormal front door opening is an actual alarm condition or that the abnormal front door opening is not an alarm condition and should be ignored by the monitoring system. In this example, the mobile phone 60 receives the user input provided by the user 50 and communicates the received user input to the monitoring server 30. The monitoring server 30 receives the user input from the mobile phone 60 and, in this case, ignores the abnormal front door opening because the user 50 confirmed that the abnormal front door opening was not an alarm condition.

In the example shown in FIG. 1B, the control panel 20 detects a back door open event on a Wednesday at 2 PM based on output from the back door sensor 26. The control panel 20 also detects an interior motion sensor event following the back door open event based on output from the motion sensor 24. In this example, the control panel 20 does not detect an alarm condition based on the back door open event and the motion sensor event because the in-home monitoring system is in an unarmed state (e.g., the user 50 forgot to arm the in-home monitoring system upon leaving). The control panel 20 sends a message to the monitoring server 30 indicating detection of the back door open event on Wednesday at 2 PM followed by the motion sensor event at a time when the in-home monitoring system is in an unarmed state. The monitoring server 30 receives the message from the control panel 20 and compares the back door open event on Wednesday at 2 PM followed by the motion sensor event with the detected patterns 40 that were automatically identified by the monitoring server 30 based on past sensor and other activity collected by the monitoring server 30. Based on the comparison, the monitoring server 30 determines that the back door open event on Wednesday at 2 PM conflicts with the first detected pattern of no door activity on Monday to Thursday between eight in the morning and five in the afternoon and determines that the order of the back door open event followed by the motion sensor event conflicts with the second detected pattern of a back door open event typically (e.g., always) proceeded by an interior motion sensor event.

The monitoring server 30 also determines that the user 50 is away from the property 10 and, therefore, confirms that the first detected pattern and the second detected pattern have been violated. Accordingly, the monitoring server 30 determines that the back door open event on Wednesday at 2 PM followed by the motion sensor event is highly abnormal, as it conflicts with two detected patterns of activity. Based on the determination of highly abnormal activity, the monitoring server 30 sends an alert to the central monitoring station server 70 to indicate a highly abnormal back door entry that needs investigation. In response to the alert, personnel at the central monitoring station take action to confirm whether the highly abnormal back door entry is an actual alarm condition and dispatch emergency personnel to the property 10, as needed. In this regard, even though the in-home monitoring system is in an unarmed state, the in-home monitoring system is still effective in detecting alarm conditions because the monitoring server 30 is able to detect highly abnormal events and take appropriate action.

In addition, the monitoring server 30 sends an alert to the user 50 indicating that the central monitoring station server 70 has been alerted to a highly abnormal back door entry.

The user 50 may view the alert on the mobile phone 60 and take action with respect to the highly abnormal back door entry. For example, the user 50 may provide user input indicating that the highly abnormal back door entry is an actual alarm condition or that the abnormal back door opening is not an alarm condition. In this example, the mobile phone 60 receives the user input provided by the user 50 and communicates the received user input to the monitoring server 30. The monitoring server 30 receives the user input from the mobile phone 60 and communicates the user input to the central monitoring station server 70 to assist the central monitoring station server 70 in determining whether the highly abnormal back door entry is an actual alarm condition.

In some implementations, rather than alerting the central station directly in response to the determination of highly abnormal activity, the monitoring server 30 may first control the control panel 20 to sound an alarm at the property 10 (e.g., activate a siren) and provide the user 50 (or another person located at the property 10) a chance to disarm the alarm before notifying the central station. In these implementations, the monitoring server 30 waits a predetermined period of time (e.g., one minute), monitors for input disarming the alarm, and alerts the central monitoring station server 70 in response to a determination that the predetermined period of time has passed without receipt of input disarming the alarm.

In the example shown in FIG. 1C, the control panel 20 detects a front door open event on a Thursday at 5:30 PM based on output from the front door sensor 22. In this example, the control panel 20 detects an alarm condition based on the front door open event because the in-home monitoring system is in an armed state. The control panel 20 sends a message to the monitoring server 30 indicating an alarm condition due to detection of the front door open event on Thursday at 5:30 PM at a time when the in-home monitoring system is in an armed state. The monitoring server 30 receives the message from the control panel 20 and compares the front door open event on Thursday at 5:30 PM with the detected patterns 40 that were automatically identified by the monitoring server 30 based on past sensor and other activity collected by the monitoring server 30. Based on the comparison, the monitoring server 30 determines that the front door open event on Thursday at 5:30 PM is consistent with the third detected pattern that, on Monday to Thursday between five and six in the afternoon, the front door sensor 22 detects opening of the front door.

To confirm whether the front door open event on Thursday at 5:30 PM is consistent with the third detected pattern, the monitoring server 30 determines a location of the user 50 based on a location of the user's mobile phone 60. Based on the determined location of the user 50, the monitoring server 30 determines that the user is at the property 10 and, therefore, the front door open event on Thursday at 5:30 PM is consistent with the third detected pattern. Accordingly, the monitoring server 30 determines that the front door open event on Thursday at 5:30 PM is consistent with the third detected pattern detected by the control panel 20 is normal and determines to delay reporting of the alarm condition to the central monitoring station server 70, thereby enabling the user 50 more time to disable the alarm condition and, potentially, reducing the chance of reporting a false alarm. In this regard, the monitoring server 30 sends a message to the control panel 20 indicating that the control panel should extend the dialer delay to provide the user 50 more time to enter a passcode needed to disarm the in-home monitoring system and also prompt the user 50 to provide input to disarm the in-home monitoring system. If the control panel 20 does not receive input to disarm the in-home monitoring system prior to expiration of the extended dialer delay period, the control panel 20 alerts the central monitoring station server 70 to the detected alarm condition.

Figure 2:
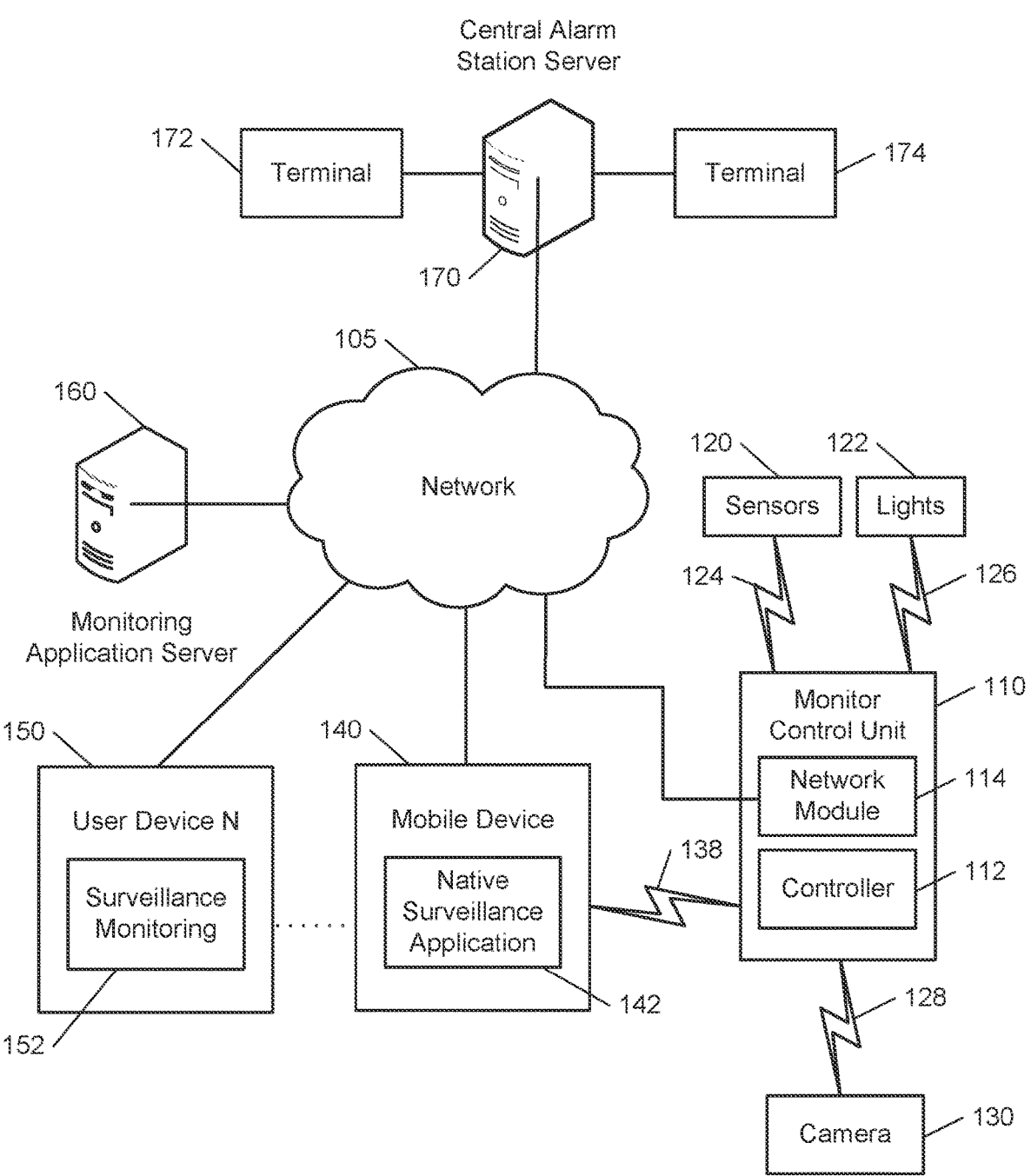
FIG. 2 illustrates an example system.

FIG. 2 illustrates an example of an electronic system 200 configured to provide surveillance and reporting. The electronic system 200 includes a network 105, a monitoring system control unit 110, one or more user devices 140, 150, a monitoring application server 160, and a central alarm station server 170. In some examples, the network 105 facilitates communications between the monitoring system control unit 110, the one or more user devices 140, 150, the monitoring application server 160, and the central alarm station server 170.

The network 105 is configured to enable exchange of electronic communications between devices connected to the network 105. For example, the network 105 may be configured to enable exchange of electronic communications between the monitoring system control unit 110, the one or more user devices 140, 150, the monitoring application server 160, and the central alarm station server 170. The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 105 may include multiple networks or subnetworks, each of which may include, for example, a wired or wireless data pathway. The network 105 may include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The monitoring system control unit 110 includes a controller 112 and a network module 114. The controller 112 is configured to control a monitoring system (e.g., a home alarm or security system) that includes the monitoring system control unit 110. In some examples, the controller 112 may include a processor or other control circuitry configured to execute instructions of a program that controls operation of an alarm system. In these examples, the controller 112 may be configured to receive input from sensors, detectors, or other devices included in the alarm system and control operations of devices included in the alarm system or other household devices (e.g., a thermostat, an appliance, lights, etc.). For example, the controller 112 may be configured to control operation of the network module 114 included in the monitoring system control unit 110.

The network module 114 is a communication device configured to exchange communications over the network 105. The network module 114 may be a wireless communication module configured to exchange wireless communications over the network 105. For example, the network module 114 may be a wireless communication device configured to exchange communications over a wireless data channel and a wireless voice channel. In this example, the network module 114 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: GSM or GPRS, CDMA, EDGE or EGPRS, EV-DO or EVDO, UMTS, or IP.

The network module 114 also may be a wired communication module configured to exchange communications over the network 105 using a wired connection. For instance, the network module 114 may be a modem, a network interface card, or another type of network interface device. The network module 114 may be an Ethernet network card configured to enable the monitoring system control unit 110 to communicate over a local area network and/or the Internet. The network module 114 also may be a voiceband modem configured to enable the alarm panel to communicate over the telephone lines of Plain Old Telephone Systems (POTS).

The monitoring system that includes the monitoring system control unit 110 includes one or more sensors or detectors. For example, the monitoring system may include multiple sensors 120. The sensors 120 may include a contact sensor, a motion sensor, a glass break sensor, or any other type of sensor included in an alarm system or security system. The sensors 120 also may include an environmental sensor, such as a temperature sensor, a water sensor, a rain sensor, a wind sensor, a light sensor, a smoke detector, a carbon monoxide detector, an air quality sensor, etc. The sensors 120 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 120 may include a radio-frequency identification (RFID) sensor that identifies a particular article that includes a pre-assigned RFID tag.

The monitoring system control unit 110 communicates with the module 122 and the camera 130 to perform surveillance or monitoring. The module 122 is connected to one or more lighting systems and is configured to control operation of the one or more lighting systems. The module 122 may control the one or more lighting systems based on commands received from the monitoring system control unit 110. For instance, the module 122 may cause a lighting system to illuminate an area to provide a better image of the area when captured by a camera 130.

The camera 130 may be a video/photographic camera or other type of optical sensing device configured to capture images. For instance, the camera 130 may be configured to capture images of an area within a building monitored by the monitoring system control unit 110. The camera 130 may be configured to capture single, static images of the area and also video images of the area in which multiple images of the area are captured at a relatively high frequency (e.g., thirty images per second). The camera 130 may be controlled based on commands received from the monitoring system control unit 110.

The camera 130 may be triggered by several different types of techniques. For instance, a Passive Infra Red (PIR) motion sensor may be built into the camera 130 and used to trigger the camera 130 to capture one or more images when motion is detected. The camera 130 also may include a microwave motion sensor built into the camera and used to trigger the camera 130 to capture one or more images when motion is detected. The camera 130 may have a "normally open" or "normally closed" digital input that can trigger capture of one or more images when external sensors (e.g., the sensors 120, PIR, door/window, etc.) detect motion or other events. In some implementations, the camera 130 receives a command to capture an image when external devices detect motion or another potential alarm event. The camera 130 may receive the command from the controller 112 or directly from one of the sensors 120.

In some examples, the camera 130 triggers integrated or external illuminators (e.g., Infra Red, Z-wave controlled "white" lights, lights controlled by the module 122, etc.) to improve image quality when the scene is dark. An integrated or separate light sensor may be used to determine if illumination is desired and may result in increased image quality.

The camera 130 may be programmed with any combination of time/day schedules, system "arming state", or other variables to determine whether images should be captured or not when triggers occur. The camera 130 may enter a low-power mode when not capturing images. In this case, the camera 130 may wake periodically to check for inbound messages from the controller 112. The camera 130 may be powered by internal, replaceable batteries if located remotely from the monitoring control unit 110. The camera 130 may employ a small solar cell to recharge the battery when light is available. Alternatively, the camera 130 may be powered by the controller's 112 power supply if the camera 130 is co-located with the controller 112.

The sensors 120, the module 122, and the camera 130 communicate with the controller 112 over communication links 124, 126, and 128. The communication links 124, 126, and 128 may be a wired or wireless data pathway configured to transmit signals from the sensors 120, the module 122, and the camera 130 to the controller 112. The sensors 120, the module 122, and the camera 130 may continuously transmit sensed values to the controller 112, periodically transmit sensed values to the controller 112, or transmit sensed values to the controller 112 in response to a change in a sensed value.

The communication link 128 over which the camera 130 and the controller 112 communicate may include a local network. The camera 130 and the controller 112 may exchange images and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 5 (CATS) or Category 6 (CAT6) wired Ethernet network.

The monitoring application server 160 is an electronic device configured to provide monitoring services by exchanging electronic communications with the monitoring system control unit 110, the one or more user devices 140, 150, and the central alarm station server 170 over the network 105. For example, the monitoring application server 160 may be configured to monitor events (e.g., alarm events) generated by the monitoring system control unit 110. In this example, the monitoring application server 160 may exchange electronic communications with the network module 114 included in the monitoring system control unit 110 to receive information regarding events (e.g., alarm events) detected by the monitoring system control unit 110. The monitoring application server 160 also may receive information regarding events (e.g., alarm events) from the one or more user devices 140, 150.

In some examples, the monitoring application server 160 may route alarm data received from the network module 114 or the one or more user devices 140, 150 to the central alarm station server 170. For example, the monitoring application server 160 may transmit the alarm data to the central alarm station server 170 over the network 105.

The monitoring application server 160 may store sensor and image data received from the monitoring system and perform analysis of sensor and image data received from the monitoring system. Based on the analysis, the monitoring application server 160 may communicate with and control aspects of the monitoring system control unit 110 or the one or more user devices 140, 150.

The central alarm station server 170 is an electronic device configured to provide alarm monitoring service by exchanging communications with the monitoring system control unit 110, the one or more mobile devices 140, 150, and the monitoring application server 160 over the network 105. For example, the central alarm station server 170 may be configured to monitor alarm events generated by the monitoring system control unit 110. In this example, the central alarm station server 170 may exchange communications with the network module 114 included in the monitoring system control unit 110 to receive information regarding alarm events detected by the monitoring system control unit 110. The central alarm station server 170 also may receive information regarding alarm events from the one or more mobile devices 140, 150.

The central alarm station server 170 is connected to multiple terminals 172 and 174. The terminals 172 and 174 may be used by operators to process alarm events. For example, the central alarm station server 170 may route alarm data to the terminals 172 and 174 to enable an operator to process the alarm data. The terminals 172 and 174 may include general-purpose computers (e.g., desktop personal computers, workstations, or laptop computers) that are configured to receive alarm data from a server in the central alarm station server 170 and render a display of information based on the alarm data. For instance, the controller 112 may control the network module 114 to transmit, to the central alarm station server 170, alarm data indicating that a sensor 120 detected a door opening when the monitoring system was armed. The central alarm station server 170 may receive the alarm data and route the alarm data to the terminal 172 for processing by an operator associated with the terminal 172. The terminal 172 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 172 and 174 may be mobile devices or devices designed for a specific function. Although FIG. 2 illustrates two terminals for brevity, actual implementations may include more (and, perhaps, many more) terminals.

The one or more user devices 140, 150 are devices that host and display user interfaces. For instance, the user device 140 is a mobile device that hosts one or more native applications (e.g., the native surveillance application 142). The user device 140 may be a cellular phone or a non-cellular locally networked device with a display. The user device 140 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 140 may perform functions unrelated to the monitoring system, such as placing personal telephone calls, playing music, playing video, displaying pictures, browsing the Internet, maintaining an electronic calendar, etc.

The user device 140 includes a native surveillance application 142. The native surveillance application 142 refers to a software/firmware program running on the corresponding mobile device that enables the user interface and features described throughout. The user device 140 may load or install the native surveillance application 142 based on data received over a network or data received from local media. The native surveillance application 142 runs on mobile devices platforms, such as iPhone, iPod touch, Blackberry, Google Android, Windows Mobile, etc. The native surveillance application 142 enables the user device 140 to receive and process image and sensor data from the monitoring system.

The user device 150 may be a general-purpose computer (e.g., a desktop personal computer, a workstation, or a laptop computer) that is configured to communicate with the monitoring application server 160 and/or the monitoring system control unit 110 over the network 105. The user device 150 may be configured to display a surveillance monitoring user interface 152 that is generated by the user device 150 or generated by the monitoring application server 160. For example, the user device 150 may be configured to display a user interface (e.g., a web page) provided by the monitoring application server 160 that enables a user to perceive images captured by the camera 130 and/or reports related to the monitoring system. Although FIG. 2 illustrates two user devices for brevity, actual implementations may include more (and, perhaps, many more) or fewer user devices.

In some implementations, the one or more user devices 140, 150 communicate with and receive monitoring system data from the monitoring system control unit 110 using the communication link 138. For instance, the one or more user devices 140, 150 may communicate with the monitoring system control unit 110 using various local wireless protocols such as wifi, Bluetooth, zwave, zigbee, HomePlug (ethernet over powerline), or wired protocols such as Ethernet and USB, to connect the one or more user devices 140, 150 to local security and automation equipment. The one or more user devices 140, 150 may connect locally to the monitoring system and its sensors and other devices. The local connection may improve the speed of status and control communications because communicating through the network 105 with a remote server (e.g., the monitoring application server 160) may be significantly slower.

Although the one or more user devices 140, 150 are shown as communicating with the monitoring system control unit 110, the one or more user devices 140, 150 may communicate directly with the sensors and other devices controlled by the monitoring system control unit 110. In some implementations, the one or more user devices 140, 150 replace the monitoring system control unit 110 and perform the functions of the monitoring system control unit 110 for local monitoring and long range/offsite communication.

In other implementations, the one or more user devices 140, 150 receive monitoring system data captured by the monitoring system control unit 110 through the network 105. The one or more user devices 140, 150 may receive the data from the monitoring system control unit 110 through the network 105 or the monitoring application server 160 may relay data received from the monitoring system control unit 110 to the one or more user devices 140, 150 through the network 105. In this regard, the monitoring application server 160 may facilitate communication between the one or more user devices 140, 150 and the monitoring system.

In some implementations, the one or more user devices 140, 150 may be configured to switch whether the one or more user devices 140, 150 communicate with the monitoring system control unit 110 directly (e.g., through link 138) or through the monitoring application server 160 (e.g., through network 105) based on a location of the one or more user devices 140, 150. For instance, when the one or more user devices 140, 150 are located close to the monitoring system control unit 110 and in range to communicate directly with the monitoring system control unit 110, the one or more user devices 140, 150 use direct communication. When the one or more user devices 140, 150 are located far from the monitoring system control unit 110 and not in range to communicate directly with the monitoring system control unit 110, the one or more user devices 140, 150 use communication through the monitoring application server 160.

Although the one or more user devices 140, 150 are shown as being connected to the network 105, in some implementations, the one or more user devices 140, 150 are not connected to the network 105. In these implementations, the one or more user devices 140, 150 communicate directly with one or more of the monitoring system components and no network (e.g., Internet) connection or reliance on remote servers is needed.

In some implementations, the one or more user devices 140, 150 are used in conjunction with only local sensors and/or local devices in a house. In these implementations, the system 200 only includes the one or more user devices 140, 150, the sensors 120, the module 122, and the camera 130. The one or more user devices 140, 150 receive data directly from the sensors 120, the module 122, and the camera 130 and sends data directly to the sensors 120, the module 122, and the camera 130. The one or more user devices 140, 150 provide the appropriate interfaces/processing to provide visual surveillance and reporting.

In other implementations, the system 200 further includes network 105 and the sensors 120, the module 122, and the camera 130 are configured to communicate sensor and image data to the one or more user devices 140, 150 over network 105 (e.g., the Internet, cellular network, etc.). In yet another implementation, the sensors 120, the module 122, and the camera 130 (or a component, such as a bridge/router) are intelligent enough to change the communication pathway from a direct local pathway when the one or more user devices 140, 150 are in close physical proximity to the sensors 120, the module 122, and the camera 130 to a pathway over network 105 when the one or more user devices 140, 150 are farther from the sensors 120, the module 122, and the camera 130. In some examples, the system leverages GPS information from the one or more user devices 140, 150 to determine whether the one or more user devices 140, 150 are close enough to the sensors 120, the module 122, and the camera 130 to use the direct local pathway or whether the one or more user devices 140, 150 are far enough from the sensors 120, the module 122, and the camera 130 that the pathway over network 105 is required. In other examples, the system leverages status communications (e.g., pinging) between the one or more user devices 140, 150 and the sensors 120, the module 122, and the camera 130 to determine whether communication using the direct local pathway is possible. If communication using the direct local pathway is possible, the one or more user devices 140, 150 communicate with the sensors 120, the module 122, and the camera 130 using the direct local pathway. If communication using the direct local pathway is not possible, the one or more user devices 140, 150 communicate with the sensors 120, the module 122, and the camera 130 using the pathway over network 105.

In some implementations, the system 200 provides end users with access to images captured by the camera 130 to aid in decision making. The system 200 may transmit the images captured by the camera 130 over a wireless WAN network to the user devices 140, 150. Because transmission over a wireless WAN network may be relatively expensive, the system 200 uses several techniques to reduce costs while providing access to significant levels of useful visual information.

In some implementations, a state of the monitoring system and other events sensed by the monitoring system may be used to enable/disable video/image recording devices (e.g., the camera 130). In these implementations, the camera 130 may be set to capture images on a periodic basis when the alarm system is armed in an "Away" state, but set not to capture images when the alarm system is armed in a "Stay" state or disarmed. In addition, the camera 130 may be triggered to begin capturing images when the alarm system detects an event, such as an alarm event, a door opening event for a door that leads to an area within a field of view of the camera 130, or motion in the area within the field of view of the camera 130. In other implementations, the camera 130 may capture images continuously, but the captured images may be stored or transmitted over a network when needed.

In some implementations, one or more of the components of the system 200 (e.g., the monitoring application server 160) may be configured to operate as an aberration engine. The aberration engine may automatically detect unusual/suspicious behavior associated with a building monitored by the system 200 and alert one or more users of the system 200 when unusual/suspicious behavior is detected. Because many people, at times, do not arm their security systems, the aberration engine attempts to detect unusual/suspicious behavior even when the security system is not in an armed state. In this regard, the aberration engine allows a security system to remain useful while it is disarmed.

The aberration engine may consider any inputs and data related to the system 200 to detect unusual/suspicious behavior. For instance, the inputs to the aberration engine may include:
  1) Historical sensor data
  2) Current status of the security system
  3) Other current status information
    a. Car or smartphone locations may be considered
  4) The customer's historical responses to aberration engine alerts
  5) A customer-specified level of sensitivity/risk for each sensor, and some measure of how much false alarms bother them The aberration engine may provide any type of output or report based on detection of unusual/suspicious behavior. For example, the output of the aberration engine may be an alert that includes:
  1) The event(s) that triggered the alert
  2) Some measure of how unusual this behavior is based on history of the system 200

3) Some actions the customer can take
   a. Notify the Central Station
   b. View video
   c. Ignore it
   d. Ignore it, and tell us not to alert about things like this again
4) Activation of an alarm (e.g., siren) at a monitored property and initiation of a dialer delay period
   a. A user may deactivate the alarm by providing appropriate input prior to expiration of the dialer delay period
   b. If the dialer delay period expires prior to receipt of input that deactivates the alarm, the central station is notified In operation, the aberration engine uses statistical analysis to decide what is "normal" and what is "abnormal." The aberration engine may use three main things to determine what is "normal" and what is "abnormal":

1) Timing
   a. If a sensor is opening at a time of day/day of week during which it has never had any activity before, that is abnormal.
2) Order of events
   a. If there has been no activity for a long time, then the back door opens, then the motion sensor goes off, that is abnormal.
3) Other info
   a. If the front door opens while none of the occupant's phones/cars are near home, that is abnormal.

The aberration engine also may treat the lack of events as abnormal. For instance, the aberration engine may consider typical alarm system input and typical sensed events and assess whether a lack alarm system input or sensed events gives rise to concern. In some examples, the aberration engine may consider the following factors:

1) If the system is typically disarmed between 3:30 and 4:30 PM, but today it was not, then alert.
2) If Timmy's phone typically comes from school along a certain path to home between 3 and 4 PM and today it went somewhere else, alert.
3) If the kitchen door is normally opened shortly after the garage door on weekday evenings, but today only the garage door was opened, alert.

The aberration engine may assign an "abnormality score" to each event (not just true/false) and determine whether unusual/suspicious behavior has occurred based on the abnormality scores. For example, a bunch of slightly suspicious events (e.g., events with low to medium abnormality scores) in a short period of time may aggregate to cause the aberration engine to alert the user. In another example, a single event with a large abnormality score may cause the aberration engine to alert the user.

The aberration engine also may determine to send the alert to more people in a more visible way as the likelihood of a real event increases and as the sensitivity/risk associated with the activity increases. For example, if the front door opens in the middle of the day on a weekday, and that happens about once per month, the aberration engine may email the main end user. If the back door opens in the middle of the night while nobody is home and is left open for a threshold period of time, and the jewelry box is opened, the aberration engine may try to notify all users, possibly including the central station.

The aberration engine also may be used in reverse to try to reduce the reporting of false alarms by extending the dialer delay in cases where the alarm goes off based on events that the aberration engine considers to be normal behavior. For example, historical data may suggest that the system is typically (e.g., always) disarmed between six and seven pm on weekdays. In this example, if the front door opens at six-thirty pm as is normal, but the system is not disarmed, the aberration engine would assess the behavior as normal and determine that the potential alarm has a high probability of being a false alarm. Accordingly, in an effort to reduce false alarms reported to the central station, the aberration engine would extend the dialer delay to allow more time for the user to disarm the security system.

The aberration engine may be run on the panel/firmware, on the backend, or on any other suitable component of the security system. In some examples, functionality of the aberration engine may be distributed among various components of the security system such that some functionality may be implemented by the panel/firmware and other functionality may be implemented by the backend.

In some implementations, all of the processing described throughout this disclosure may be implemented in a monitoring system control panel located inside the property being monitored, as opposed to sending data to an external server for processing. For example, rather than being a separate server located in a remote location, the monitoring application server 160 may be a logical component inside of the monitoring system control unit 110. In this example, the monitoring system control unit 110 performs the processing of the aberration engine without having to send sensor data to a separate server separated by a network.

In other implementations, all of the processing described throughout this disclosure may be performed on a remote server (e.g., monitoring application server 160). In these implementations, the monitoring system control panel (or sensors themselves) may send sensor data to the remote server over a network and the remote server may perform all of the aberration engine analysis of the sensor data. For instance, the monitoring system control unit 110 sends all captured sensor data to the monitoring application server 160 and the monitoring application server 160 performs the processing of the aberration engine.

In still further implementations, the processing described throughout this disclosure may be mixed between a monitoring system control panel and a remote server. In these implementations, the monitoring system control panel and the remote server may share operations needed to analyze the sensor data. For instance, the monitoring system control panel may perform the aberration engine analysis of the sensor data collected relatively recently (e.g., sensor data collected within the past three months) and the remote server may perform the aberration engine analysis of the sensor data collected over a longer period of time (e.g., sensor data collected over the past several years). Alternatively, the monitoring system control panel may perform pre-processing of the sensor data, including collection and aggregation of the sensor data, and the remote server may perform the detailed analysis of detecting patterns within the sensor data. In the example shown in FIG. 2, the processing described throughout this disclosure may be mixed between the monitoring system control unit 110 and the monitoring application server 160.

FIGS. 3, 8, 10, and 12 illustrate example processes. The operations of the example processes are described generally as being performed by the system 200. The operations of the example processes may be performed by one of the components of the system 200 (e.g., the monitor control unit 110, the monitoring application server 160, etc.) or may be performed by any combination of the components of the system 200. In some implementations, operations of the example processes may be performed by one or more processors included in one or more electronic devices.

Figure 3:
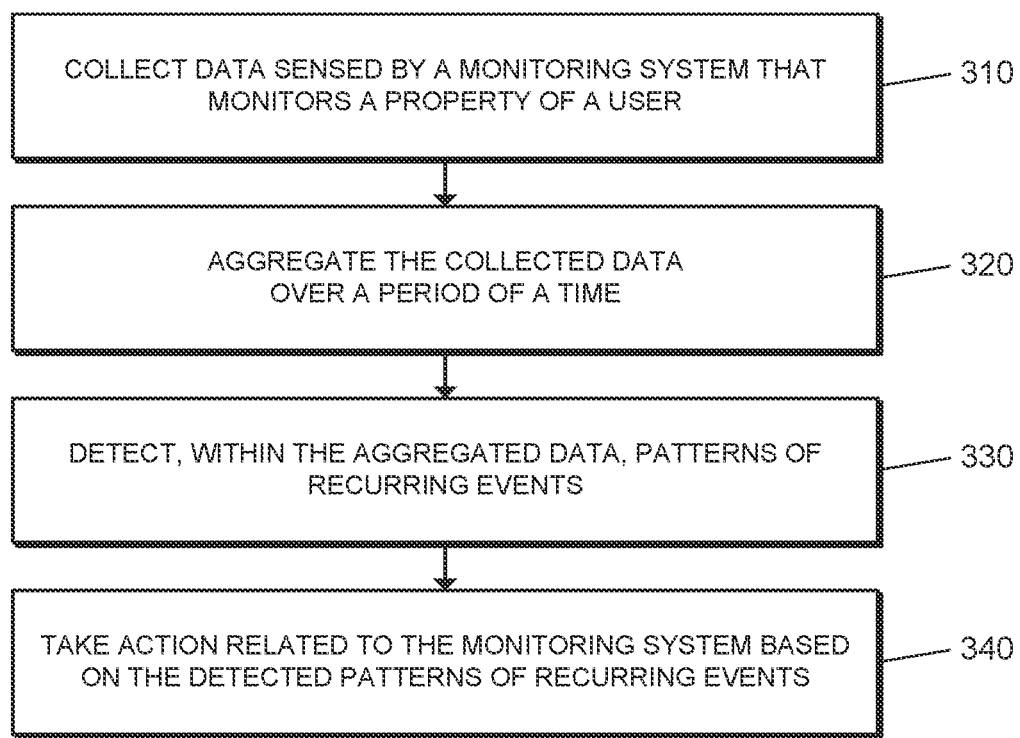

FIG. 3 illustrates an example process 300 for taking action related to a monitoring system based on detected patterns of recurring events with aggregated monitoring data. The system 200 collects data sensed by a monitoring system that monitors a property of a user (310). For example, the system 200 receives, over a network, data describing sensor events detected by sensors fixed at the property of the user. In this example, the sensor events may be contact sensor events detected by door and window sensors located at doors and windows of the property, motion sensor events detected by motion sensors located at the property, and any other type of sensor events detected by other types described throughout this disclosure. The system 200 receives all sensor events detected by the monitoring system, regardless of whether the monitoring system is in an armed state or an unarmed state when the sensor events are detected.

The system 200 aggregates the collected data over a period of a time (320). For instance, the system 200 identifies the property and/or user associated with collected sensor events and stores sensor events collected over time for the identified property and/or user with an indication of the identified property and/or user. In this regard, the system 200 stores the collected sensor events in a manner that enables the system 200 to access all of the collected sensor events for the identified property and/or user. The system 200 may aggregate the collected sensor events over any period of time, including all sensor events collected over years, sensor events collected over a period of one or more months, sensor events collected over a period of one or more weeks, or other suitable time periods that enable the system 200 to detect recurring events in the aggregated sensor data.

The system 200 detects, within the aggregated data, patterns of recurring events (330). For instance, the system 200 analyzes the aggregated data to detect patterns of recurring sensor events in the aggregated data. The system 200 may detect events as events sensed by sensors of the monitoring system as well as a lack of sensor events detected. The system 200 may consider the timing of events, such as events that repeat on a routine basis (e.g., events that occur at the relatively same time everyday day or events that occur at the relatively same time on a particular day of the week). The system 200 also may consider orders in which events occur (e.g., a particular motion sensor event routinely precedes a particular door open event). The order of events may be considered with respect to timing or irrespective of timing.

In detecting patterns, the system 200 may consider any type of historical sensor activity detected by a monitoring system located at a property. The system 200 also may consider other types of activity, such as location data of one or more users of the monitoring system, data collected by sensors of a vehicle of one or more users of the monitoring system, weather data accessible to the monitoring system, or any other type of data that the system 200 is capable of collecting, aggregating, and analyzing.

To detect patterns within the aggregated data, the system 200 may use any type of data mining techniques capable of detecting patterns of recurring events. The system 200 may perform an automatic or semi-automatic analysis of relatively large quantities of sensor data to extract previously unknown interesting patterns, such as identifying groups of sensor events using cluster analysis, identifying unusual sensor events using anomaly detection, and identifying dependencies using association rule mining Based on the patterns detected, the system 200 may assign a confidence score for each pattern that reflects a level of confidence that the detected pattern is actually a pattern of recurring events that will be observed in the future. The system 200 may determine the confidence score based on a percentage of time the pattern has occurred in the past, the amount of data used in detecting the pattern, and any statistical techniques that assess whether the pattern is a statistically significant pattern of recurring events.

FIG. 4 illustrates an example data record 400 that stores patterns detected within aggregated sensor data and confidence scores for each of the detected patterns. The data record 400 includes a first column 410 for a detected pattern and a second column 420 for a confidence score associated with the pattern stored in the column 410. As shown, a first detected pattern 430 indicates that the system 200 detected a pattern of a lack of sensor activity on Saturdays between seven in the morning to one in the afternoon. The first detected pattern 430 has a confidence score of sixty, which indicates that the pattern is more likely than not, but not overly confident (e.g., no sensor activity on Saturdays between seven in the morning to one in the afternoon has been detected sixty percent of the time).

A second detected pattern 440 indicates that the system 200 detected a pattern of arming the monitoring system in a "Stay" mode by eleven in the evening when all users are detected as being at home. The second detected pattern 440 has a confidence score of ninety, which indicates that the pattern is likely (e.g., arming the monitoring system in a "Stay" mode by eleven in the evening when all users are detected as being at home has occurred ninety percent of the time).

A third detected pattern 450 indicates that the system 200 detected a pattern of arming the monitoring system in an "Away" mode by nine in the morning when all users are detected as being away from home. The third detected pattern 450 has a confidence score of ninety-five, which indicates that the pattern is likely (e.g., arming the monitoring system in an "Away" mode by nine in the morning when all users are detected as being away from home has occurred ninety-five percent of the time).

A fourth detected pattern 460 indicates that the system 200 detected a pattern of window opening events being preceded by interior motion detection events. The window opening events may be for a specific window or all windows in a monitored property. The fourth detected pattern 460 has a confidence score of one hundred, which indicates that the pattern is very likely (e.g., window opening events have been preceded by interior motion detection events one hundred percent of the time).

A fifth detected pattern 470 indicates that the system 200 detected a pattern of back door opening events being preceded by interior motion detection events daily between six to seven in the morning and ten to eleven in the evening. The fifth detected pattern 470 has a confidence score of eighty, which indicates that the pattern is likely (e.g., back door opening events have been preceded by interior motion detection events daily between six to seven in the morning and ten to eleven in the evening eighty percent of the time).

A sixth detected pattern 480 indicates that the system 200 detected a pattern of a lack of sensor activity on Sundays between eight in the morning to noon. The sixth detected pattern 480 has a confidence score of seventy, which indicates that the pattern is more likely than not, but not overly confident (e.g., no sensor activity on Sundays between eight in the morning to noon has been detected seventy percent of the time).

In some implementations, the system 200 uses a threshold confidence score in determining whether or not to detect and continue monitoring a pattern. In these implementations, the system 200 may use a confidence score of sixty as a threshold (e.g., patterns that occur at least sixty percent of the time). Accordingly, patterns having a confidence score lower than sixty are not included in the data record 400 and do not impact the monitoring system, unless the pattern increases to warrant further consideration (e.g., increases to a confidence score at sixty or above).

Referring again to FIG. 3, the system 200 takes action related to the monitoring system based on the detected patterns of recurring events (340). For instance, the system 200 may suggest rules (e.g., alerts) for the monitoring system based on the detected patterns of recurring events, may automatically set rules (e.g., alerts) for the monitoring system based on the detected patterns of recurring events, and may send alerts to a user or a central monitoring station to indicate detection of abnormal activity. By taking action based on the detected patterns of recurring events, the system 200 may enhance the ease with which a user is able to configure a monitoring system and enable a user to benefit from having a monitoring system, even though the user is not diligent about arming the monitoring system and setting alerting rules for the monitoring system.

Figure 5:
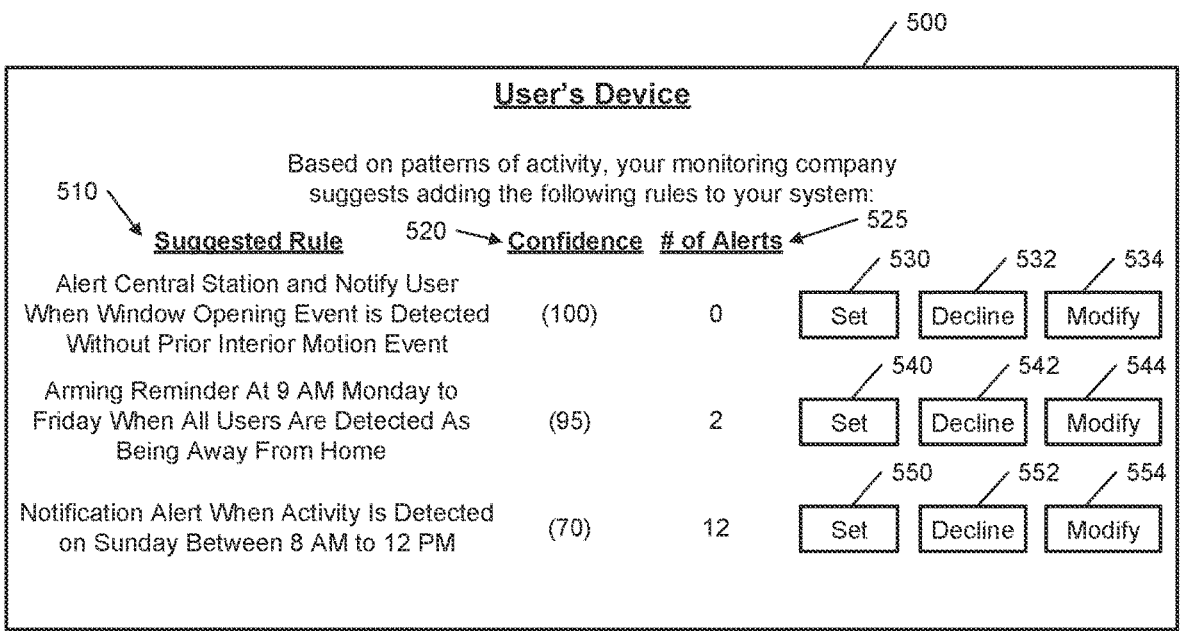
FIGS. 5-7, 11, 13, and 14 illustrate example interfaces.

FIG. 5 illustrates an example interface 500 that makes suggestions based on the detected patterns of recurring events. The interface 500 may be part of a message (e.g., electronic mail message) sent to a device of a user of a monitoring system or may be displayed when the user of the monitoring system accesses a web page associated with the monitoring system. The system 200 may cause display of the interface 500 when new patterns of recurring events have been detected. The system 200 may cause display of the interface 500 as part of taking action related to the monitoring system based on the detected patterns of recurring events described above with respect to reference numeral 340.

As shown, the interface 500 includes a list of suggested rules 510, a confidence 520 that reflects a level of confidence of the system 200 in suggesting the rule, and a number of expected alerts 525 that reflects a number of alerts the system 200 expects to result from the rule over a given time period (e.g., one year). The confidence 520 and the number of expected alerts 525 may assist a user in determining whether or not to adopt a suggested rule. A first suggested rule is to alert the central station and notify the user when the system 200 detects a window opening event without prior detection of an interior motion sensor event. The system 200 suggests the first suggested rule based on the fourth detected pattern 460 that window openings have always been preceded by interior motion sensor events. Accordingly, the system 200 suggests the first suggested rule because historical sensor data confirms that it is highly unlikely that a window opening from outside the property (e.g., without a prior interior motion sensor event) is normal. The interface 500 shows that the system 200 has a confidence level of one hundred for the first suggested rule, which may indicate that the first suggested rule is being suggested based on a pattern that has occurred one hundred percent of the time. The interface 500 also shows that, based on historical sensor data, the system 200 expects to send zero alerts for the first suggested rule over the course of a year.

The interface 500 includes a set control 530 that receives input to set the first suggested rule for the monitoring system. The interface 500 also includes a decline control 532 that receives input to decline the first suggested rule for the monitoring system. The interface 500 further includes a modify control 534 that receives input to accept the first suggested rule for the monitoring system, but in a modified format. The modify control 534 may cause display of another interface that enables a user to provide input to modify the first suggested rule by adding, removing, and/or changing criteria for meeting the rule and/or changing actions taken when the rule has been met. The system 200 may consider decisions to set, decline, and modify the first suggested rule in future suggestions made to the user.

A second suggested rule is to set an arming reminder at nine in the morning when the system 200 detects all of the users being away from home and detects the monitoring system being in an unarmed state. The system 200 suggests the second suggested rule based on the third detected pattern 450 of arming the monitoring system in an "Away" mode by nine in the morning when all users are detected as being away from home. Accordingly, the system 200 suggests the second suggested rule because historical sensor data confirms that the monitoring system is typically armed by nine in the morning when all users are detected as being away from home. The interface 500 shows that the system 200 has a confidence level of ninety-five for the second suggested rule, which may indicate that the second suggested rule is being suggested based on a pattern that has occurred ninety-five percent of the time. The interface 500 also shows that, based on historical sensor data, the system 200 expects to send two alerts for the second suggested rule over the course of a year.

The interface 500 includes a set control 540 that receives input to set the second suggested rule for the monitoring system. The interface 500 also includes a decline control 542 that receives input to decline the second suggested rule for the monitoring system. The interface 500 further includes a modify control 544 that receives input to accept the second suggested rule for the monitoring system, but in a modified format. The modify control 544 may cause display of another interface that enables a user to provide input to modify the second suggested rule by adding, removing, and/or changing criteria for meeting the rule and/or changing actions taken when the rule has been met. The system 200 may consider decisions to set, decline, and modify the second suggested rule in future suggestions made to the user.

A third suggested rule is to set a notification alert when the system 200 detects activity on Sunday between eight in the morning and noon. The system 200 suggests the third suggested rule based on the sixth detected pattern 480 of a lack of sensor activity on Sundays between eight in the morning to noon. Accordingly, the system 200 suggests the third suggested rule because historical sensor data confirms that the monitoring system does not typically sense activity on Sunday between eight in the morning and noon. The interface 500 shows that the system 200 has a confidence level of seventy for the third suggested rule, which may indicate that the third suggested rule is being suggested based on a pattern that has occurred seventy percent of the time. The interface 500 also shows that, based on historical sensor data, the system 200 expects to send twelve alerts for the first suggested rule over the course of a year.

The interface 500 includes a set control 550 that receives input to set the third suggested rule for the monitoring system. The interface 500 also includes a decline control 552 that receives input to decline the third suggested rule for the monitoring system. The interface 500 further includes a modify control 554 that receives input to accept the third suggested rule for the monitoring system, but in a modified format. The modify control 554 may cause display of another interface that enables a user to provide input to modify the third suggested rule by adding, removing, and/or changing criteria for meeting the rule and/or changing actions taken when the rule has been met. The system 200 may consider decisions to set, decline, and modify the third suggested rule in future suggestions made to the user.

Figure 6:
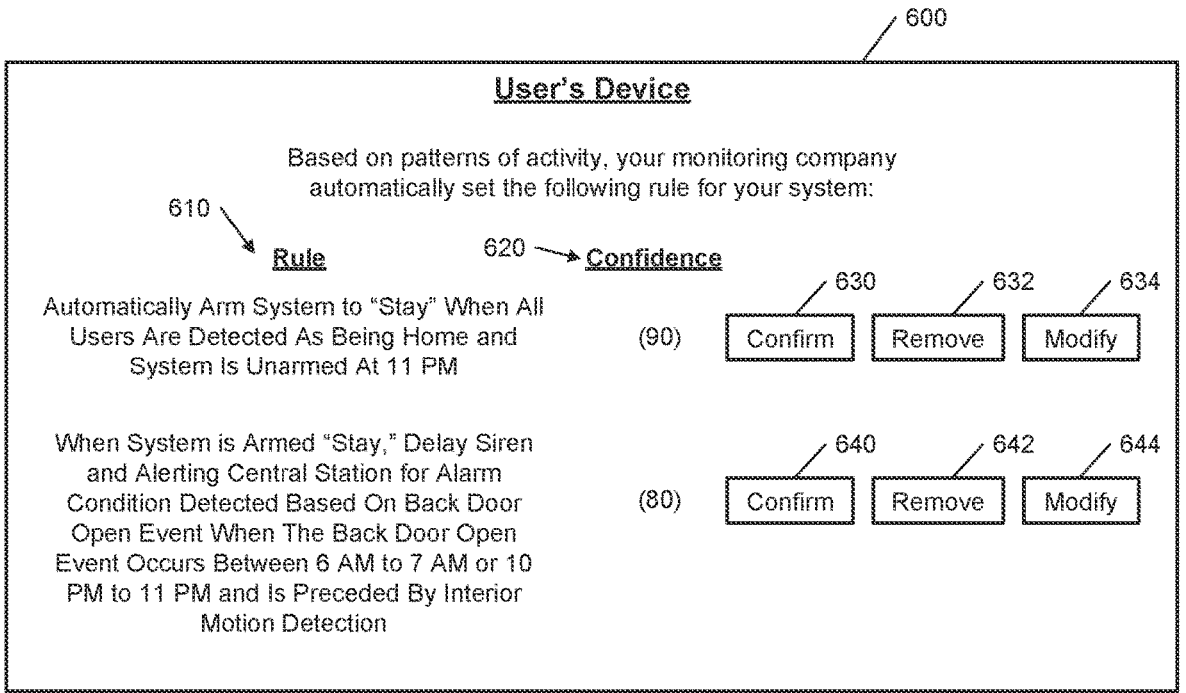

FIG. 6 illustrates an example interface 600 that alerts a user to rules automatically set for a monitoring system based on the detected patterns of recurring events. The system 200 may automatically set the rules without human intervention or any user input. The interface 600 may be part of a message (e.g., electronic mail message) sent to a device of a user of a monitoring system or may be displayed when the user of the monitoring system accesses a web page associated with the monitoring system. The system 200 may cause display of the interface 600 when new patterns of recurring events have been detected and new rules automatically set. The system 200 may cause display of the interface 600 as part of taking action related to the monitoring system based on the detected patterns of recurring events described above with respect to reference numeral 340.

As shown, the interface 600 includes a list of automatically set rules 610 and a confidence 620 that reflects a level of confidence of the system 200 in automatically setting the rule. The confidence 620 may assist a user in determining whether or not to confirm or remove an automatically set rule. A first rule is to automatically arm the system to "Stay" when all users are detected as being home and system is unarmed at 11 PM. The system 200 automatically sets the first rule based on the second detected pattern 440 that the system 200 detected a pattern of arming the monitoring system in a "Stay" mode by eleven in the evening when all users are detected as being at home. Accordingly, the system 200 automatically set the first rule because historical sensor data confirms that it is likely that the users of the monitoring system like to have the monitoring system set in the "Stay" mode by eleven in the evening when all users are detected as being at home and the automatic arming addresses situations in which the users forget to set the monitoring system in the "Stay" mode without waking sleeping users with an alert. The interface 600 shows that the system 200 has a confidence level of ninety for the first rule, which may indicate that the first rule was automatically set based on a pattern that has occurred ninety percent of the time.

The interface 600 includes a confirm control 630 that receives input to confirm that the first rule should be set for the monitoring system. The interface 600 also includes a remove control 632 that receives input to remove the first rule for the monitoring system. The interface 600 further includes a modify control 634 that receives input to confirm that the first rule should be set for the monitoring system, but in a modified format. The modify control 634 may cause display of another interface that enables a user to provide input to modify the first rule by adding, removing, and/or changing criteria for meeting the rule and/or changing actions taken when the rule has been met. The system 200 may consider decisions to confirm, remove, and modify the first rule in future automatic setting of rules for the monitoring system of the user.

A second rule is to, when the system is armed "Stay," delay activating a siren and delay alerting the central station for an alarm condition detected based on a back door open event when the back door open event occurs between 6 AM to 7 AM or 10 PM to 11 PM and is preceded by an interior motion sensor event. The system 200 automatically sets the second rule based on the fifth detected pattern 470 that the system 200 detected a pattern of back door opening events being preceded by interior motion detection events daily between six to seven in the morning and ten to eleven in the evening. Accordingly, the system 200 automatically set the second rule because historical sensor data confirms that it is likely that the user of the monitoring system opening the back door from inside of the home between 6 AM to 7 AM or 10 PM to 11 PM is normal and, therefore, the second rule gives the user more time to disarm the monitoring system prior to taking action for an alarm condition. The interface 600 shows that the system 200 has a confidence level of eighty for the second rule, which may indicate that the second rule was automatically set based on a pattern that has occurred eighty percent of the time.

The interface 600 includes a confirm control 640 that receives input to confirm that the second rule should be set for the monitoring system. The interface 600 also includes a remove control 642 that receives input to remove the second rule for the monitoring system. The interface 600 further includes a modify control 644 that receives input to confirm that the second rule should be set for the monitoring system, but in a modified format. The modify control 644 may cause display of another interface that enables a user to provide input to modify the second rule by adding, removing, and/or changing criteria for meeting the rule and/or changing actions taken when the rule has been met. The system 200 may consider decisions to confirm, remove, and modify the second rule in future automatic setting of rules for the monitoring system of the user.

Figure 7:
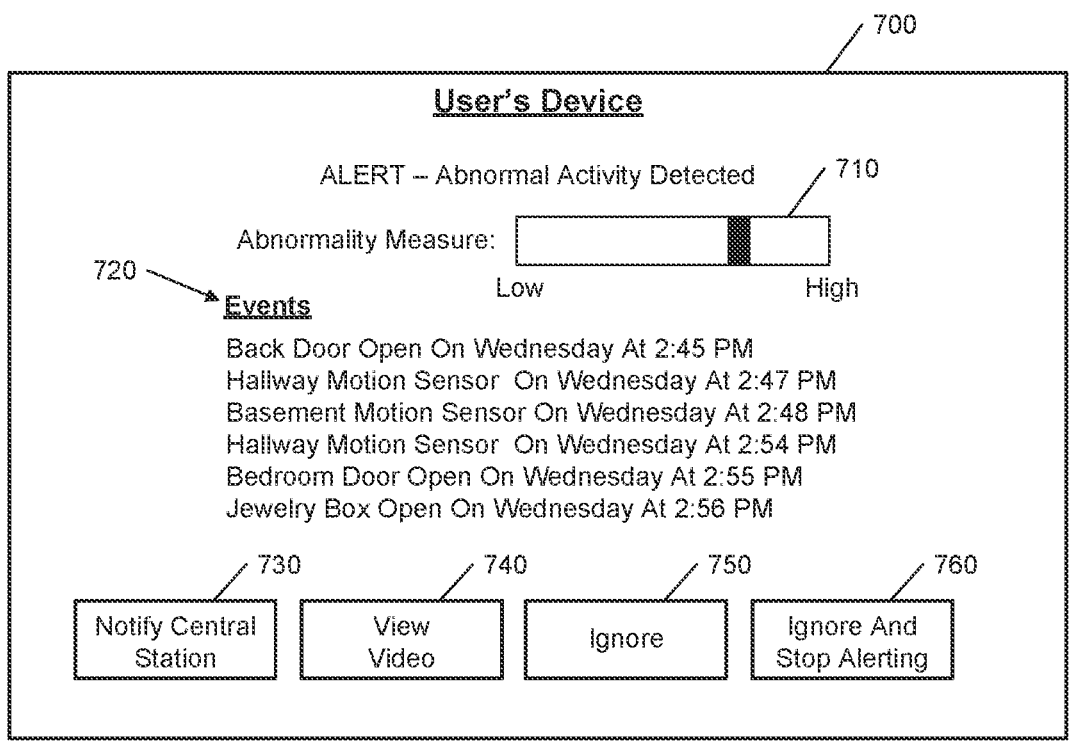

FIG. 7 illustrates an example interface 700 that alerts a user to abnormal activity. The interface 700 may be part of a message (e.g., electronic mail message) sent to a device of a user of a monitoring system when abnormal activity has been detected. The system 200 may cause display of the interface 700 as part of taking action related to the monitoring system based on the detected patterns of recurring events described above with respect to reference numeral 340.

The system 200 may detect abnormal activity based on a series of events that are each slightly abnormal, but, when considered together, suggest abnormal activity. For instance, the system 200 may identify a series of events detected by the monitoring system and determine abnormality measures based on the detected patterns of recurring events within the aggregated data. The determined abnormality measures may include an abnormality measure for each event included in the series of events. The system 200 then may determine an abnormality score for the series of events based on the determined abnormality measures, compare the abnormality score to a threshold, and, based on the comparison, determine that the abnormality score meets the threshold (e.g., the abnormality score is greater than an abnormality threshold). Based on the determination that the abnormality score meets the threshold, the system 200 may send, to the user, an alert including the interface 700, which indicates that the monitoring system has detected abnormal activity at the property of the user.

The interface 700 includes an abnormality measure 710 that reflects a level of abnormality represented by the series of events. The abnormality measure 710 may be determined based on the abnormality score and, as shown, may be represented as a bar that reflects whether the abnormal activity is highly abnormal, moderately abnormal, or slightly abnormal. The abnormality measure 710 provides a quick indication of whether the level of abnormality of the detected activity is relatively low or relatively high and, therefore, may assist the user in determining how closely the user reviews the alert including the interface 700.

The interface 700 also includes a list of events 720 that resulted in the system 200 detecting abnormal activity at the property of the user. The list of events 720 enables a user to review the sensor events that led to the determination of abnormal activity and determine whether the events are normal or related to an alarm condition.

The interface 700 further includes interface controls 730-760 that enable a user to respond and handle the report of abnormal activity. The interface controls 730-760 include a notify central station control 730 that receives user input to indicate that the user believes the abnormal activity is an alarm condition that should be reported to the central station. In response to user activation of the notify central station control 730, the system 200 receives the indication that the user believes the abnormal activity is an alarm condition and then reports the alarm condition to the central station with an indication that the user has confirmed that the activity is an alarm condition.

The interface controls 730-760 also include a view video control 740 that receives user input to indicate that the user would like to view video of the property to assist in determining whether the activity is normal or an alarm condition. In response to user activation of the view video control 740, the system 200 receives the indication that the user would like to view video of the property and then sends video captured by a camera located at the property to the user's device for viewing. After viewing the video, the user may provide additional input to indicate whether the activity is normal or an alarm condition.

The interface controls 730-760 further include an ignore control 750 and an ignore and stop alerting control 760. The ignore control 750 receives user input to indicate that the user would like to ignore the abnormal activity alert, as the user believes the events relate to authorized use of the property. The ignore and stop alerting control 760 receives user input to indicate that the user would like to ignore the abnormal activity alert and also that the user would like to stop receiving alerts related to abnormal activity.

FIG. 8 illustrates an example process 800 for determining an abnormality score and using the abnormality score in deciding whether to take action in response to potentially abnormal activity at a monitored property. The process 800 may be used in taking action related to the monitoring system based on the detected patterns of recurring events referenced above with respect to reference numeral 340.

The system 200 assigns scores to rules related to detected patterns (810). For instance, the system 200 determines an abnormality score to assign to each rule based on how abnormal it is for the one or more events that trigger the rule to occur. The system 200 may determine the abnormality score based on the confidence in the pattern that led to the rule being suggested or automatically set. The system 200 stores the assigned scores in association with the rules.

FIG. 9 illustrates an example data record 900 that stores rules and abnormality scores for each of the rules. The data record 900 includes a first column 910 for a rule used in assessing whether sensor activity is abnormal and a second column 920 for an abnormality score associated with the rule stored in the column 910. As shown, a first rule 930 indicates that the system 200 considers activity on Saturday between 7 AM and 1 PM to be abnormal. The first rule 930 has an abnormality score of 0.1, which indicates that the rule has a relatively low contribution to detection of abnormal activity. The abnormality score for the first rule 930 may be set based on the first detected pattern 430 described above with respect to FIG. 4. The abnormality scores may be normalized to values between –1.0 to 1.0.

A second rule 935 indicates that the system 200 considers activity on Sunday between 8 AM and 12 PM to be abnormal. The second rule 935 has an abnormality score of 0.2, which indicates that the rule has a relatively low contribution to detection of abnormal activity. The abnormality score for the second rule 935 may be set based on the sixth detected pattern 480 described above with respect to FIG. 4.

A third rule 940 indicates that the system 200 considers activity on Monday to Thursday between 9 AM and 5 PM to be abnormal. The third rule 940 has an abnormality score of 0.4, which indicates that the rule has a relatively medium contribution to detection of abnormal activity.

A fourth rule 945 indicates that the system 200 considers a window opening event that is not preceded by an interior motion sensor event to be abnormal. The fourth rule 945 has an abnormality score of 1.0, which indicates that the rule has a relatively high contribution to detection of abnormal activity. The abnormality score for the fourth rule 945 may be set based on the fourth detected pattern 460 described above with respect to FIG. 4.

A fifth rule 950 indicates that the system 200 considers a door opening event followed by interior motion detection between 11 PM to 6 AM to be abnormal. The fifth rule 950 has an abnormality score of 0.8, which indicates that the rule has a relatively high contribution to detection of abnormal activity.

A sixth rule 955 indicates that the system 200 considers a user's location being away from home as contributing to activity at the home being considered as abnormal. The sixth rule 955 has an abnormality score of 0.2, which indicates that the rule has a relatively low contribution to detection of abnormal activity.

A seventh rule 960 indicates that the system 200 considers a user's location being at home as contributing against activity at the home being considered as abnormal. The seventh rule 960 has an abnormality score of –0.6, which indicates that the rule has a relatively medium contribution to detection of activity as being normal.

An eighth rule 965 indicates that the system 200 considers a user's recent trend of ignoring abnormal activity alerts as contributing against activity at the home being considered as abnormal. The eighth rule 965 has an abnormality score of –0.2, which indicates that the rule has a relatively low contribution to detection of activity as being normal.

Referring again to FIG. 8, the system 200 compares detected events to the rules related to detected patterns (820). For instance, the system 200 detects sensor events captured by sensors located at the property of the user and compares the sensor events to the rules. The system 200 also may detect user location events and compare the user location events to the rules. The system 200 further may detect user input events (e.g., decisions to ignore abnormal activity) and compare the user input events to the rules.

Based on the comparison, the system 200 identifies one or more events that meet one or more of the rules (830) and accesses scores associated with the one or more rules (840). For example, the system 200 determines whether the sensor events, the user location events, and the user input events match any of the rules related to detected patterns (e.g., the rule stored in the data record 900). In this example, for each matching rule, the system 200 accesses the abnormality score assigned to the rule.

The system 200 combines the accessed scores to determine an abnormality score for the detected events (850). For instance, the system 200 may sum all of the accessed scores to determine a total abnormality score. Other techniques for combining the accessed scores using weights or other mathematical or statistical processed may be used.

The system 200 compares the abnormality score to a threshold (860) and, based on the comparison, the system 200 determines whether the abnormality score meets the threshold (870). For instance, the system 200 accesses the threshold and compares the abnormality score to the accessed threshold to determine whether the abnormality score is less than, equal to, or greater than the threshold. The system 200 may determine that the threshold is met using any of the determinations depending on the implementation, such as determining that the threshold is met based on the abnormality score being greater than the threshold or determining that the threshold is met based on the abnormality score being greater than or equal to the threshold.

Based on a determination that the abnormality score meets the threshold, the system 200 takes action for abnormal activity (880). For example, the system 200 sends an alert to the user to indicate detection of abnormal activity that meets the threshold. In this example, the system 200 may send an alert having content similar to that included in the interface 700 described above with respect to FIG. 7.

Based on a determination that the abnormality score does not meet the threshold, the system 200 continues monitoring detected events and updates the abnormality score based on newly detected events and timing of newly detected events (890). For example, the system 200 continues to determine whether newly detected events meet any of the rules, accesses scores for any rules that match the newly detected events, and updates the abnormality score based on the accessed scores for the newly detected events. In this example, the system 200 may add the accessed scores for the newly detected events to the abnormality score and determine whether the new abnormality score reaches the threshold or not.

In addition, the system 200 may consider the timing of the newly detected events in updating the abnormality score. For instance, slightly abnormal events that are detected far apart in terms of timing are unlikely to signal abnormal activity. Accordingly, the system 200 may periodically decrement the abnormality score a certain amount (e.g., decrement the abnormality score by 0.2 every hour). In this regard, the decrementing of the abnormality score reduces the chance of abnormal activity being detected based on slightly abnormal events that are spaced far apart in terms of time.

In some implementations, the system 200 may compute a new abnormality score each time a new rule is violated. In these implementations, the system 200 may compute the new abnormality score based on an abnormality measure for the new rule violation in addition to abnormality measures for any rules that were violated within a threshold period of time (e.g., two hours) of the new rule violation. In this regard, the system 200 only considers events that have occurred relatively closely in time in determining whether the events suggest abnormal activity.

Figure 10:
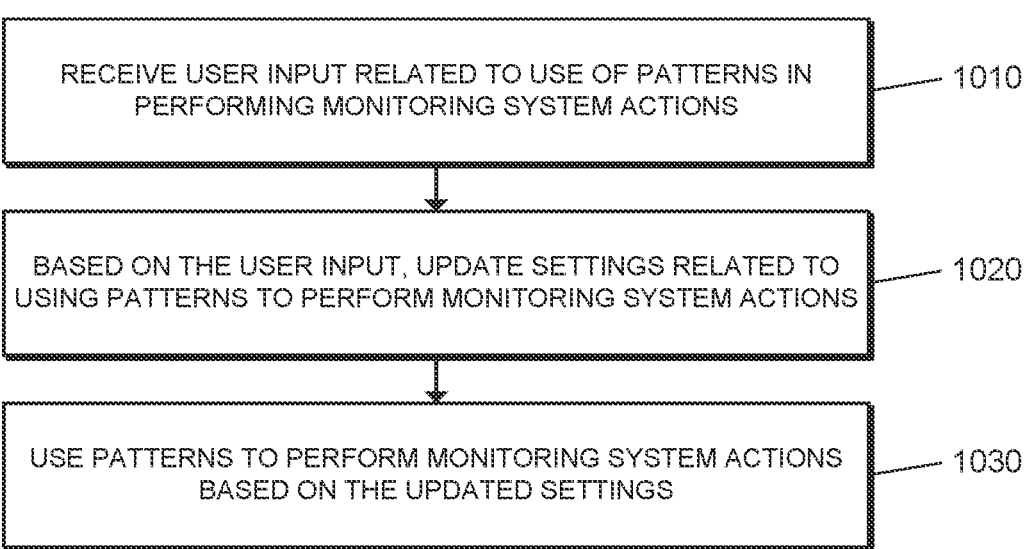

FIG. 10 illustrates an example process 1000 for updating how detected patterns are used in performing monitoring system actions based on user input. The system 200 receives user input related to use of patterns in performing monitoring system actions (1010). For example, the system 200 may receive input indicating the user's general preference for alerting relative to how the system 200 has been alerting the user to abnormal activity. In this example, the system 200 may receive input indicating that the user would like to be alerted more frequently or input indicating the user would like to be alerted less frequently.

In some implementations, the system 200 may receive input related to specific rules or patterns being used by the system 200. In these implementations, the system may receive input to confirm, delete, or modify specific rules or patterns that are used by the system 200.

Based on the user input, the system 200 updates settings related to using patterns to perform monitoring system actions (1020). For example, when the user input indicates the user's general preference for alerting relative to how the system 200 has been alerting the user to abnormal activity, the system 200 updates general settings that apply to all detected patterns and all rules set based on detected patterns. In this example, the system 200 may modify an abnormality threshold used in detecting abnormal activity based on input indicating that the user would like to be alerted more or less frequently. The system 200 also may uniformly modify the abnormality measures or scores assigned to all of the individual rules or detected patterns based on input indicating that the user would like to be alerted more or less frequently. The system 200 further may uniformly modify the confidence level needed to detect a pattern based on input indicating that the user would like to be alerted more or less frequently.

In implementations in which the user input relates to specific rules or patterns being used by the system 200, the system 200 updates settings for the specific rules or patterns. For instance, in accordance with the user input, the system 200 may modify abnormality measures or scores assigned to the specific rules or patterns and may modify the specific rules or patterns by adding, removing, and/or changing criteria for meeting the specific rules or patterns and/or changing actions taken when the specific rules or patterns have been met.

The system 200 uses patterns to perform monitoring system actions based on the updated settings (1030). For instance, the system 200 may use the updated setting in any of the techniques described throughout this disclosure for taking action related to the monitoring system based on the detected patterns of recurring events.

Figure 11:
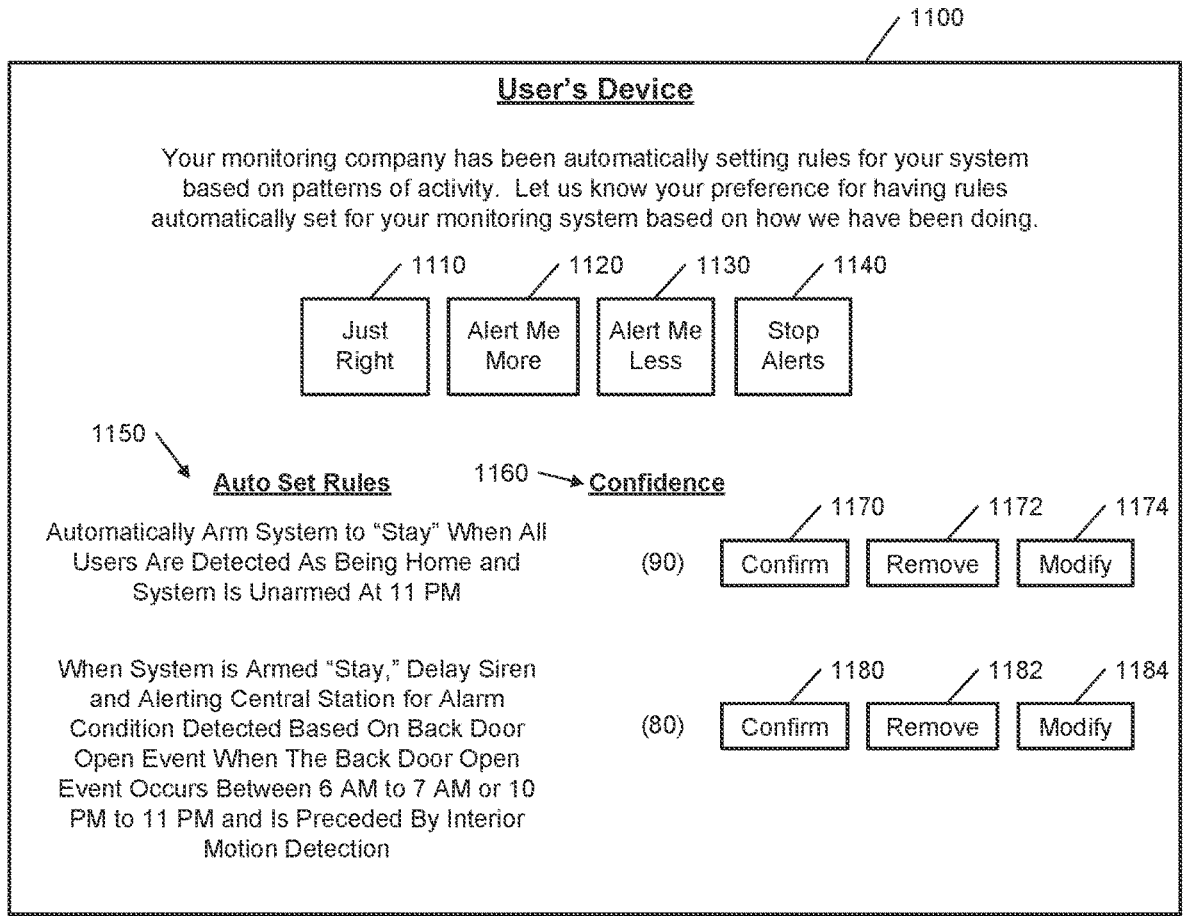

FIG. 11 illustrates an example interface 1100 that enables a user to adjust settings related to using patterns to perform monitoring system actions. The interface 1100 may be part of a message (e.g., electronic mail message) sent to a device of a user of a monitoring system or may be displayed when the user of the monitoring system accesses a web page associated with the monitoring system. The system 200 may cause display of the interface 1100 when new patterns of recurring events have been detected and new rules automatically set. The system 200 may cause display of the interface 1100 as part of receiving user input related to use of patterns in performing monitoring system actions described above with respect to reference numeral 1010.

The interface 1100 includes a just right control 1110, an alert me more control 1120, an alert me less control 1130, and a stop alerting control 1140. The controls 1110-1140 enable a user to provide input indicating the user's general preference for alerting. The just right control 1110 receives input to indicate that the user is satisfied with the alerting that has been provided and would like the alerting to continue in the same manner. In response to receiving user input selecting the just right control 1110, the system 200 maintains settings related to using patterns to perform monitoring system actions without changes.

The alert me more control 1120 receives input to indicate that the user would like to be alerted more to detections of potentially abnormal activity. In response to receiving user input selecting the alert me more control 1120, the system 200 adjusts settings related to using patterns to perform monitoring system actions in a manner that would generate more alerts based on potentially abnormal activity. For instance, the system 200 may lower an abnormality score threshold used in determining whether to send an alert for abnormal activity. By lowering the threshold, the system 200 sends alerts based on a lower level of abnormal activity, thereby resulting in more alerts. In addition, the system 200 may lower a confidence level needed to detect a pattern of activity. By lowering the confidence level needed to detect a pattern of activity, the system 200 may detect patterns more quickly with less confidence and, therefore, result in alerts for more potential patterns of activity.

The alert me less control 1130 receives input to indicate that the user would like to be alerted less to detections of potentially abnormal activity. In response to receiving user input selecting the alert me less control 1130, the system 200 adjusts settings related to using patterns to perform monitoring system actions in a manner that would generate fewer alerts based on potentially abnormal activity. For instance, the system 200 may increase an abnormality score threshold used in determining whether to send an alert for abnormal activity. By increasing the threshold, the system 200 sends alerts based on a higher level of abnormal activity, thereby resulting in fewer alerts. In addition, the system 200 may raise a confidence level needed to detect a pattern of activity. By raising the confidence level needed to detect a pattern of activity, the system 200 may take longer to detect patterns and do so with higher confidence, thereby resulting in alerts for fewer potential patterns of activity.

The stop alerting control 1140 receives input to indicate that the user does not wish to receive any alerts related to abnormal activity detected using patterns of recurring events. In response to receiving user input selecting the stop alerting control 1140, the system 200 stops detecting patterns and stops providing alerts to the user based on detected patterns.

In addition, the interface 1100 includes a list of automatically set rules 1150 and a confidence 1160 that reflects a level of confidence of the system 200 in automatically setting the rule. The interface 1100 also includes a confirm control 1170, a remove control 1172, and a modify control 1174 for a first automatically set rule and a confirm control 1180, a remove control 1182, and a modify control 1184 for a second automatically set rule. The list 1150 and the confidence 1160 are similar to the list 610 and the confidence 620 described above with respect to FIG. 6. The confirm controls 1170 and 1180, the remove controls 1172 and 1182, and the modify controls 1182 and 1184 are similar to the confirm controls 630 and 640, the remove controls 632 and 642, and the modify controls 634 and 644 described above with respect to FIG. 6. Inclusion of the confirm controls 1170 and 1180, the remove controls 1172 and 1182, and the modify controls 1182 and 1184 in the interface 1100 allow a user to provide input on specific automatically set rules in addition to (or instead of) input indicating the user's general preference for alerting provided through controls 1110-1140.

Figure 12:
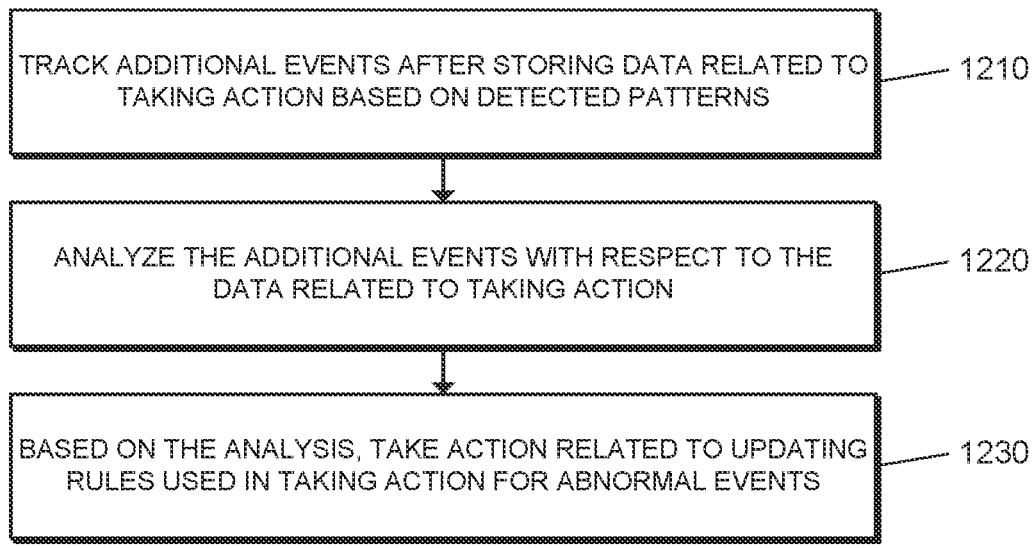

FIG. 12 illustrates an example process 1200 for updating rules used in taking action for abnormal events. The system 200 tracks additional events after storing data related to taking action based on detected patterns (1210). For example, after performing analysis to detect patterns and set rules for the monitoring system, the system 200 tracks additional events. In this example, the additional events may be additional sensor events detected by sensors located at the monitored property, additional user location events that track a location of mobile devices of users of the monitoring system, additional user input events that track how the user has updated and responded to different action taken by the system 200 in response to detecting patterns, and any other events that are described throughout this disclosure or that may be helpful in detecting patterns that assist in identifying abnormal activity. In tracking additional events, the system 200 may use techniques similar to those described above with respect to reference numerals 310 and 320 in FIG. 3.

The system 200 analyzes the additional events with respect to the data related to taking action (1220). For example, the system 200 may periodically analyze whether the additional events impact the patterns of recurring events previously detected by the system 200. In this example, the system 200 may, each month, compare additional events detected over the past month with the patterns of recurring events previously detected and determine whether the previously detected patterns still hold. The system 200 also may initiate analysis of additional events based on an amount of additional events tracked reaching a threshold level. In analyzing the additional events with respect to the data related to taking action, the system 200 may use techniques similar to those described above with respect to reference numeral 330 in FIG. 3.

Based on the analysis, the system 200 taking action related to updating rules used in taking action for abnormal events (1230). For instance, the system 200 may suggest updates to the rules and/or patterns used in detecting abnormal activity or may automatically make updates to the rules and/or patterns used in detecting abnormal activity. In taking action related to updating rules used in taking action for abnormal events, the system 200 may use techniques similar to those described above with respect to reference numeral 340 in FIG. 3.

Figure 13:
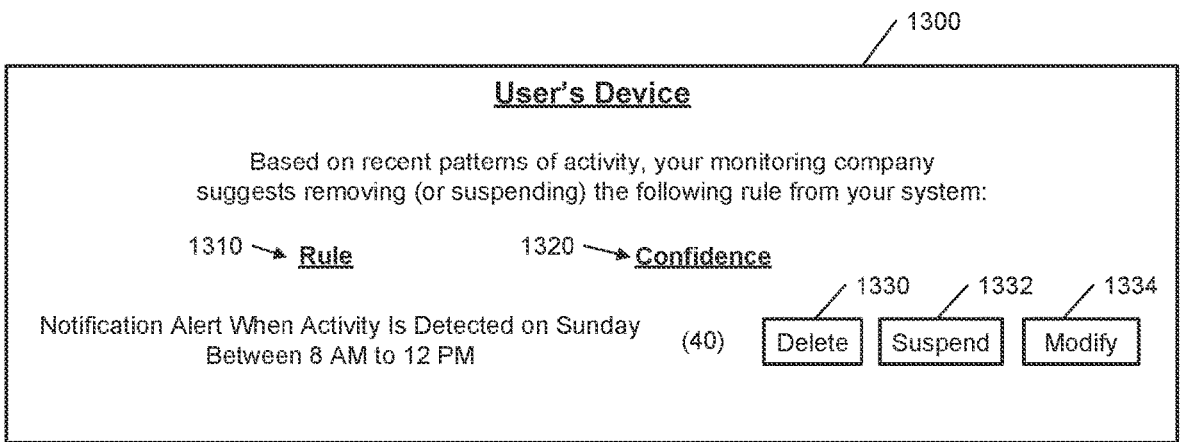

FIG. 13 illustrates an example interface 1300 that makes suggestions for updating rules based on changes to detected patterns of recurring events. The interface 1300 may be part of a message (e.g., electronic mail message) sent to a device of a user of a monitoring system or may be displayed when the user of the monitoring system accesses a web page associated with the monitoring system. The system 200 may cause display of the interface 1300 when new events are detected that impact previously recognized patterns of recurring events. The system 200 may cause display of the interface 1300 as part of taking action related to updating rules used in taking action for abnormal events described above with respect to reference numeral 1230.

As shown, the interface 1300 includes a list of suggested rule modifications 1310 and a confidence 1320 that reflects a level of confidence the system 200 has in the rule. The confidence 1320 may assist a user in determining whether or not to adjust a rule that has been set. A first suggested rule modification is to remove or suspend a notification alert that occurs when the system 200 detects activity on Sunday between eight in the morning and noon. The interface 1300 shows that the confidence level in the rule has dropped from seventy to forty, which may indicate that the pattern that initially resulted in the rule being suggested or automatically set has dropped from occurring seventy percent of the time to only occurring forty percent of the time based on new events detected by the system 200 that conflict with the pattern.

The interface 1300 includes a delete control 1330 that receives input to delete the rule associated with the first suggested rule modification. The interface 1300 also includes a suspend control 1332 that receives input to suspend the rule associated with the first suggested rule modification. The suspend control 1332 may cause the rule to be suspended for a predefined period of time (e.g., one month), may cause the rule to be suspended until the confidence in the rule returns to a threshold level of confidence (e.g., returns to seventy), or may prompt the user for additional input to define the period of time for which the rule should be suspended. The interface 1300 further includes a modify control 1334 that receives input to retain the rule associated with the first suggested rule modification, but in a modified format. The modify control 1334 may cause display of another interface that enables a user to provide input to modify the rule associated with the first suggested rule modification by adding, removing, and/or changing criteria for meeting the rule and/or changing actions taken when the rule has been met. The user also may ignore the suggestions made in the interface 1300 and, thereby, confirm that the rule associated with the first suggested rule modification should be retained in its current form. The system 200 may consider decisions to delete, suspend, modify, and confirm the rule associated with the first suggested rule modification in future suggestions made to the user.

Figure 14:
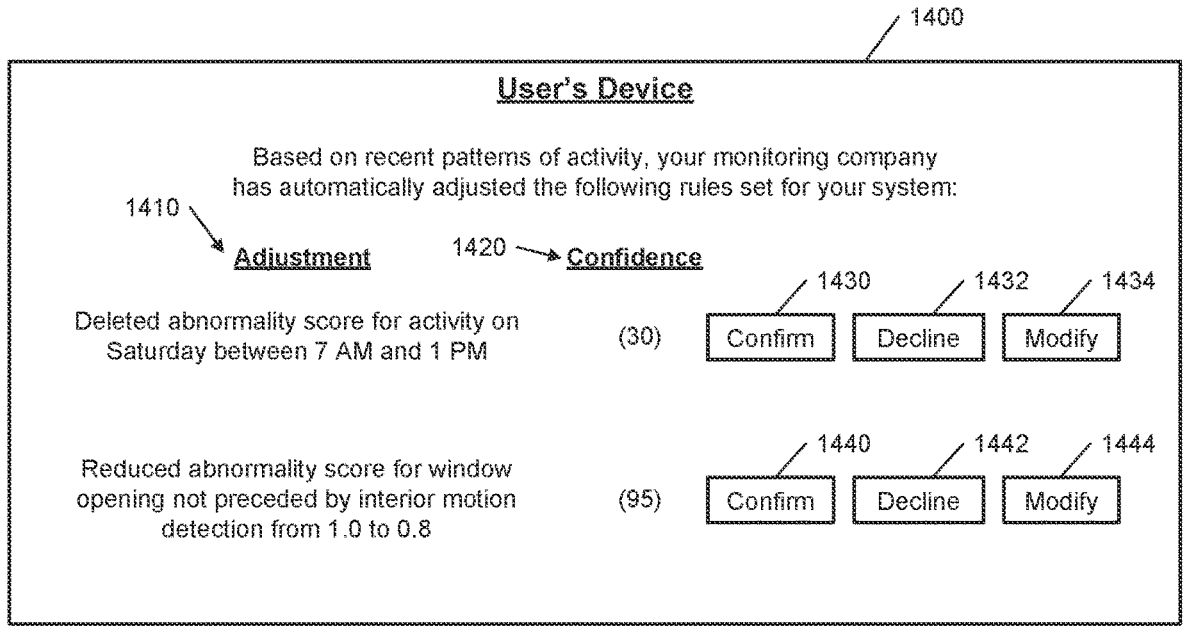

FIG. 14 illustrates an example interface 1400 that alerts a user to adjustments automatically made to rules set for a monitoring system based on changes to detected patterns of recurring events. The system 200 may automatically make the rule adjustments without human intervention or any user input. The interface 1400 may be part of a message (e.g., electronic mail message) sent to a device of a user of a monitoring system or may be displayed when the user of the monitoring system accesses a web page associated with the monitoring system. The system 200 may cause display of the interface 1400 when new events are detected that impact previously recognized patterns of recurring events and cause automatic adjustments to rules. The system 200 may cause display of the interface 1400 as part of taking action related to updating rules used in taking action for abnormal events described above with respect to reference numeral 1230.

As shown, the interface 1400 includes a list of automatic adjustments 1410 and a confidence 1420 that reflects a level of confidence of the system 200 has in the rule. The confidence 1420 may assist a user in determining whether or not to confirm or decline an automatic adjustment. A first rule considered activity on Saturday between 7 AM and 1 PM to be abnormal. The system 200 has automatically deleted the first rule by deleting an abnormality score assigned to the first rule. The system 200 automatically deleted the first rule because the confidence level in the rule has dropped from sixty to forty, which may indicate that the pattern that initially resulted in the rule being suggested or automatically set has dropped from occurring sixty percent of the time to only occurring forty percent of the time based on new events detected by the system 200 that conflict with the pattern.

The interface 1400 includes a confirm control 1430 that receives input to confirm that the first rule should be deleted. The interface 1400 also includes a decline control 1432 that receives input to decline the automatic adjustment and maintain the first rule. The interface 1400 further includes a modify control 1434 that receives input to confirm that the first rule should be adjusted, but in a different way. The modify control 1434 may cause display of another interface that enables a user to provide input to modify the first rule by adding, removing, and/or changing criteria for meeting the rule and/or changing actions taken when the rule has been met. The system 200 may consider decisions to confirm, decline, and modify the adjustment to the first rule in future automatic adjustment of rules for the monitoring system of the user.

A second rule considered detection of a window opening event that is not preceded by an interior motion sensor event to be highly abnormal. The second rule was assigned an abnormality score of 1.0 to reflect the high degree of abnormality associated with the second rule. The system 200 has automatically reduced the abnormality score assigned to the second rule from 1.0 to 0.8. The system 200 automatically reduced the abnormality score for the second rule because the confidence level in the rule has dropped from one hundred to ninety-five, which may indicate that the pattern that initially resulted in the rule being suggested or automatically set has dropped from occurring one hundred percent of the time to only occurring ninety-five percent of the time based on new events detected by the system 200 that conflict with the pattern.

The interface 1400 includes a confirm control 1440 that receives input to confirm that the abnormality score for the second rule should be reduced. The interface 1400 also includes a decline control 1442 that receives input to decline the automatic adjustment and maintain the abnormality score for the second rule. The interface 1400 further includes a modify control 1444 that receives input to confirm that the abnormality score for the second rule should be adjusted, but in a different way. The modify control 1444 may cause display of another interface that enables a user to provide input to modify the second rule by adding, removing, and/or changing criteria for meeting the rule and/or changing actions taken when the rule has been met. The system 200 may consider decisions to confirm, decline, and modify the adjustment to the second rule in future automatic adjustment of rules for the monitoring system of the user.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
monitoring sensor data for a property;
determining, using the sensor data and historical data, a degree of abnormality for the sensor data and a likely event represented by the sensor data;
in response to determining the likely event represented by the sensor data, determining, using the degree of abnormality for the sensor data, to wait a time period for receipt of additional data before determining an action type for the sensor data;
during the time period, monitoring for additional data;
detecting an end of the time period;
in response to detecting the end of the time period, selecting, using the degree of abnormality and from a plurality of different action types, the action type for the likely event represented by the sensor data; and
causing performance by one or more devices of an action having the action type.

2. The method of claim 1, wherein determining, using the sensor data and the historical data, the degree of abnormality for the sensor data comprises:
determining, from a plurality of different time frames, a time frame within which the sensor data was captured; and
determining, using the sensor data, the historical data, and the time frame within which the sensor data occurred, the degree of abnormality for the sensor data.

3. The method of claim 1, wherein determining, using the sensor data and the historical data, the degree of abnormality for the sensor data comprises:
determining that a) a second time period during which the sensor data was captured and b) a time sequence of the sensor data that indicates when a first portion of the sensor data was captured by a first device and a second portion of the sensor data was captured by a second device together likely identify an abnormal event; and
using the second time period and the time sequence, determining the degree of abnormality for the sensor data.

4. The method of claim 3, wherein determining, using the sensor data and historical data, the degree of abnormality for the sensor data and the likely event represented by the sensor data comprises:
maintaining event data for one or more events associated with the degree of abnormality;
maintaining series data for one or more series of events associated with the degree of abnormality; and
determining the degree of abnormality for the sensor data using two or more of the second time period, the time sequence, the event data, or the series data.

5. The method of claim 1, wherein the action type comprises providing a notification.

6. The method of claim 5, comprising:
in response to providing the notification, receiving data from the one or more devices, response data indicating that the degree of abnormality of the sensor data is wrong; and
in response to receiving the response data from the one or more devices, indicating the degree of abnormality of the sensor data is wrong, changing settings that affect the selection of the action type.

7. The method of claim 5, wherein providing the notification comprises:
providing a list of sensor data details used in the determination of the degree of abnormality for the sensor data.

8. A system comprising one or more computers and one or more non-transitory storage devices on which are stored instructions that are operable, when executed by the one or more computers, to cause the one or more computers to perform operations comprising:
monitoring sensor data for a property;
determining, using the sensor data and historical data, a degree of abnormality for the sensor data and a likely event represented by the sensor data;
in response to determining the likely event represented by the sensor data, determining, using the degree of abnormality for the sensor data, to wait a time period for receipt of additional data before determining an action type for the sensor data;
during the time period, monitoring for additional data;
detecting an end of the time period;
in response to detecting the end of the time period, selecting, using the degree of abnormality and from a plurality of different action types, the action type for the likely event represented by the sensor data; and
causing performance by one or more devices of an action having the action type.

9. The system of claim 8, wherein determining, using the sensor data and the historical data, the degree of abnormality for the sensor data comprises:
determining, from a plurality of different time frames, a time frame within which the sensor data was captured; and
determining, using the sensor data, the historical data, and the time frame within which the sensor data occurred, the degree of abnormality for the sensor data.

10. The system of claim 8, wherein determining, using the sensor data and the historical data, the degree of abnormality for the sensor data comprises:
determining that a) a second time period during which the sensor data was captured and b) a time sequence of the sensor data that indicates when a first portion of the sensor data was captured by a first device and a second portion of the sensor data was captured by a second device together likely identify an abnormal event; and
using the second time period and the time sequence, determining the degree of abnormality for the sensor data.

11. The system of claim 10, wherein determining, using the sensor data and historical data, the degree of abnormality for the sensor data and the likely event represented by the sensor data comprises:
maintaining event data for one or more events associated with the degree of abnormality;
maintaining series data for one or more series of events associated with the degree of abnormality; and
determining the degree of abnormality for the sensor data using two or more of the second time period, the time sequence, the event data, or the series data.

12. The system of claim 8, wherein the action type comprises providing a notification.

13. The system of claim 12, the operations comprising:

in response to providing the notification, receiving data from the one or more devices, response data indicating that the degree of abnormality of the sensor data is wrong; and in response to receiving the response data from the one or more devices, indicating the degree of abnormality of the sensor data is wrong, changing settings that affect the selection of the action type.

14. The system of claim 12, wherein providing the notification comprises:

providing a list of sensor data details used in the determination of the degree of abnormality for the sensor data.

15. One or more non-transitory computer storage media encoded with instructions that, when executed by one or more computers, cause the one or more computers to perform operations comprising:

monitoring sensor data for a property;

determining, using the sensor data and historical data, a degree of abnormality for the sensor data and a likely event represented by the sensor data;

in response to determining the likely event represented by the sensor data, determining, using the degree of abnormality for the sensor data, to wait a time period for receipt of additional data before determining an action type for the sensor data;

during the time period, monitoring for additional data;

detecting an end of the time period;

in response to detecting the end of the time period, selecting, using the degree of abnormality and from a plurality of different action types, the action type for the likely event represented by the sensor data; and causing performance by one or more devices of an action having the action type.

16. The non-transitory computer storage media of claim 15, wherein determining, using the sensor data and the historical data, the degree of abnormality for the sensor data comprises:

determining, from a plurality of different time frames, a time frame within which the sensor data was captured; and determining, using the sensor data, the historical data, and the time frame within which the sensor data occurred, the degree of abnormality for the sensor data.

17. The non-transitory computer storage media of claim 15, wherein determining, using the sensor data and the historical data, the degree of abnormality for the sensor data comprises:

determining that a) a second time period during which the sensor data was captured and b) a time sequence of the sensor data that indicates when a first portion of the sensor data was captured by a first device and a second portion of the sensor data was captured by a second device together likely identify an abnormal event; and using the second time period and the time sequence, determining the degree of abnormality for the sensor data.

18. The non-transitory computer storage media of claim 17, wherein determining, using the sensor data and historical data, the degree of abnormality for the sensor data and the likely event represented by the sensor data comprises:

maintaining event data for one or more events associated with the degree of abnormality;

maintaining series data for one or more series of events associated with the degree of abnormality; and determining the degree of abnormality for the sensor data using two or more of the second time period, the time sequence, the event data, or the series data.

19. The non-transitory computer storage media of claim 15, wherein the action type comprises providing a notification, the operations comprising:

in response to providing the notification, receiving data from the one or more devices, response data indicating that the degree of abnormality of the sensor data is wrong; and in response to receiving the response data from the one or more devices, indicating the degree of abnormality of the sensor data is wrong, changing settings that affect the selection of the action type.

20. The non-transitory computer storage media of claim 19, wherein providing the notification comprises:

providing a list of sensor data details used in the determination of the degree of abnormality for the sensor data.

* * * * *